US012739858B2

(12) United States Patent
Kim et al.

(10) Patent No.: US 12,739,858 B2
(45) Date of Patent: Sep. 15, 2026

(54) METHOD AND DEVICE FOR TRANSMITTING OR RECEIVING SIGNAL BY TERMINAL IN WIRELESS COMMUNICATION SYSTEM SUPPORTING SIDELINK

(71) Applicant: LG Electronics Inc., Seoul (KR)

(72) Inventors: Heejin Kim, Seoul (KR); Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 740 days.

(21) Appl. No.: 18/005,140

(22) PCT Filed: Jul. 19, 2021

(86) PCT No.: PCT/KR2021/009251
§ 371 (c)(1),
(2) Date: Jan. 11, 2023

(87) PCT Pub. No.: WO2022/015122
PCT Pub. Date: Jan. 20, 2022

(65) Prior Publication Data

US 2023/0262729 A1 Aug. 17, 2023

Related U.S. Application Data

(60) Provisional application No. 63/059,918, filed on Jul. 31, 2020, provisional application No. 63/053,541, filed on Jul. 17, 2020.

(51) Int. Cl.

| | |
|---|---|
| ***H04W 72/25*** | (2023.01) |
| ***H04W 56/00*** | (2009.01) |
| ***H04W 72/51*** | (2023.01) |

(52) U.S. Cl.
CPC ....... *H04W 72/25* (2023.01); *H04W 56/0045* (2013.01); *H04W 72/51* (2023.01)

(58) Field of Classification Search
CPC .................................................... H04W 72/25
See application file for complete search history.

(56) References Cited

U.S. PATENT DOCUMENTS

| | | | | |
|---|---|---|---|---|
| 2018/0167820 | A1 | 6/2018 | Belleschi et al. | |
| 2018/0227973 | A1 * | 8/2018 | Tsuboi ................. | H04W 8/005 |

(Continued)

FOREIGN PATENT DOCUMENTS

| | | | |
|---|---|---|---|
| WO | 2020/032653 | A1 | 2/2020 |
| WO | 2020/032658 | A1 | 2/2020 |

OTHER PUBLICATIONS

Notice of Allowance in Korean Appln. No. 10-2023-7001090, mailed on Mar. 26, 2026, 8 pages (with English translation).

*Primary Examiner* — Pamit Kaur
(74) *Attorney, Agent, or Firm* — Fish & Richardson P.C.

(57) ABSTRACT

Disclosed are a method and a device in which a terminal receives a signal by using at least one distributed antenna unit (DU) and a center antenna unit (CU) controlling the at least one distributed antenna unit in a wireless communication system supporting a sidelink according to various embodiments. Disclosed are a method and a device therefor, the method comprising the steps of: receiving a first signal and a second signal by using at least one DU; transferring first information, which is decoding information for the first signal, from the at least one DU to the CU through a first interface; and decoding the second signal on the basis of the first information by using the CU, wherein a feedback signal for the second signal is transmitted on the basis of a time gap configured for the second signal, and the time gap is configured in consideration of a time error or a time delay related to the first interface.

12 Claims, 18 Drawing Sheets

(56) References Cited

U.S. PATENT DOCUMENTS

2020/0220694 A1 7/2020 Khoryaev et al.
2023/0057047 A1* 2/2023 Hosseini ............... H04L 1/0031

* cited by examiner (a)

(b)

(a)

(b)

Distibute unit #1
Distibute unit #N
RF
Analog interface
ADC / DAC
Modem
PHY/MAC/RLC/PDCP/RRC/NAS
Application Processor (AP)
Center unit
(a)
ADC / DAC
Digital interface
(b)
Modem(Partial)
Modem (Partial)
(c)
PHY/MAC/RLC/PDCP/RRC/NAS
(d)

METHOD AND DEVICE FOR TRANSMITTING OR RECEIVING SIGNAL BY TERMINAL IN WIRELESS COMMUNICATION SYSTEM SUPPORTING SIDELINK

CROSS-REFERENCE TO RELATED APPLICATIONS

This application is a National Stage application under 35 U.S.C. § 371 of International Application No. PCT/KR2021/009251, filed on Jul. 19, 2021, which claims the benefit of U.S. Provisional Application No. 63/059,918, filed on Jul. 31, 2020, and 63/053,541, filed on Jul. 17, 2020. The disclosures of the prior applications are incorporated by reference in their entirety.

TECHNICAL FIELD

The present disclosure relates to a method of transmitting and receiving signals using at least one distributed antenna unit and a central antenna unit by a user equipment in a wireless communication system supporting sidelink and an apparatus therefor.

BACKGROUND

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between terminals without going through a base station (BS). SL is being considered as one way to solve the burden of the base station due to the rapidly increasing data traffic.

V2X (vehicle-to-everything) refers to a communication technology that exchanges information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

FIG. 1 is a diagram comparing RAT-based V2X communication before NR with NR-based V2X communication.

Regarding V2X communication, in RAT prior to NR, a scheme for providing a safety service based on V2X messages such as a basic safety message (BSM), a cooperative awareness message (CAM), and a decentralized environmental notification message (DENM) was mainly discussed. The V2X message may include location information, dynamic information, and attribute information. For example, the UE may transmit a periodic message type CAM and/or an event triggered message type DENM to another UE.

For example, the CAM may include dynamic state information about a vehicle such as direction and speed, vehicle static data such as dimensions, and basic vehicle information such as external lighting conditions and route details. For example, a UE may broadcast the CAM, and the CAM latency may be less than 100 ms. For example, when an unexpected situation such as a breakdown of the vehicle or an accident occurs, the UE may generate a DENM and transmit the same to another UE. For example, all vehicles within the transmission coverage of the UE may receive the CAM and/or DENM. In this case, the DENM may have a higher priority than the CAM.

Regarding V2X communication, various V2X scenarios have been subsequently introduced in NR. For example, the various V2X scenarios may include vehicle platooning, advanced driving, extended sensors, and remote driving.

For example, based on vehicle platooning, vehicles may dynamically form a group and move together. For example, to perform platoon operations based on vehicle platooning, vehicles belonging to the group may receive periodic data from a leading vehicle. For example, the vehicles belonging to the group may reduce or increase the distance between the vehicles based on the periodic data.

For example, based on advanced driving, a vehicle may be semi-automated or fully automated. For example, each vehicle may adjust trajectories or maneuvers based on data acquired from local sensors of nearby vehicles and/or nearby logical entities. Also, for example, each vehicle may share driving intention with nearby vehicles.

For example, on the basis of extended sensors, raw data or processed data acquired through local sensors, or live video data may be exchanged between a vehicle, a logical entity, UEs of pedestrians and/or a V2X application server. Thus, for example, the vehicle may recognize an environment that is improved over an environment that may be detected using its own sensor.

For example, for a person who cannot drive or a remote vehicle located in a dangerous environment, a remote driver or V2X application may operate or control the remote vehicle based on remote driving. For example, when a route is predictable as in the case of public transportation, cloud computing-based driving may be used to operate or control the remote vehicle. For example, access to a cloud-based back-end service platform may be considered for remote driving.

A method to specify service requirements for various V2X scenarios such as vehicle platooning, advanced driving, extended sensors, and remote driving is being discussed in the NR-based V2X communication field.

SUMMARY

An object of the present disclosure is to provide a method and apparatus capable of minimizing an increase in complexity of a distributed antenna unit (DU) while minimizing cabling loss caused by an existing analog interface by distributing or splitting a decoding function of a physical layer between the DU and a central antenna unit (CU) through a first interface between the DU and the CU.

A time gap related to a transmission timing of a feedback signal related to a received signal may be configured in consideration of a latency time that may occur due to the first interface.

It will be appreciated by those of ordinary skill in the art to which the embodiment(s) pertain that the objects that could be achieved with the embodiment(s) are not limited to what has been particularly described hereinabove and the above and other objects will be more clearly understood from the following detailed description.

According to an aspect of the present disclosure, provided herein is a method of receiving signals using at least one distributed antenna unit (DU) and a center antenna unit (CU) by a user equipment (UE) in a wireless communication system supporting sidelink includes receiving a first signal and a second signal, using the at least one DU, delivering first information, which is decoding information for the first signal, from the at least one DU to the CU through a first interface, and decoding the second signal based on the first information using the CU. A feedback signal related to the second signal is transmitted based on a time gap configured for the second signal, and the time gap is configured in consideration of time latency or a time error related to the first interface.

The first information may include at least one of resource information for a physical sidelink shared channel (PSSCH), a demodulation reference signal (DMRS) pattern for the PSSCH, the number of PSSCH DMRS ports, indexes of the PSSCH DMRS ports, or information about a second sidelink control information (SCI) format, based on the first signal being a physical sidelink control channel (PSCCH) and the second signal being the PSSCH.

The time gap may be selected as one of a plurality of time gaps configured with respect to a resource pool configured for the UE, based on the time latency or the time error related to the first interface.

The method may further include reporting capability information including information about the time latency or the time error to a base station.

The UE may transmit information about the configured time gap to a peer UE that has transmitted the first signal and the second signal.

The UE may transmit information about a maximum transmission rate supportable by the first interface.

The first interface may deliver timing information about the at least one DU to the CU from the at least one DU.

The at least one DU may perform at least one of cyclic prefix (CP) removal, fast Fourier transform (FFT), or resource demapping, with respect to the second signal.

The first interface may deliver at least one of in-phase and quadrature (IQ) samples obtained from the second signal or timing information about the at least one DU in relation to the second signal to the CU from the at least one DU.

In another aspect of the present disclosure, provided herein is a method of allocating a resource pool to a user equipment (UE) by a base station in a wireless communication system supporting sidelink, including receiving a report on capability information including information about time latency or a time error related to a first interface from the UE, configuring a time gap for a resource pool based on the capability information, and transmitting a signal for allocating the resource pool in which the time gap is configured to the UE. The first interface is an interface through which digital information is transferred between at least one distributed antenna unit and a central antenna unit, disposed in the UE, and the time gap is related to a transmission timing of a feedback signal based on reception of a physical sidelink shared channel (PSSCH).

In another aspect of the present disclosure, provided herein is a user equipment (UE) for receiving signals in a wireless communication system supporting sidelink, including a radio frequency (RF) transceiver, and a processor connected to the RF transceiver. The processor is configured to receive a first signal and a second signal by controlling at least one distributed antenna unit (DU) including the RF transceiver, deliver first information, which is decoding information for the first signal, from the at least one DU to a central antenna unit (CU) through a first interface, and decode the second signal based on the first information by controlling the CU. A feedback signal related to the second signal is transmitted based on a time gap configured for the second signal, and the time gap is configured in consideration of time latency or a time error related to the first interface.

The first information may include at least one of resource information for a physical sidelink shared channel (PSSCH), a demodulation reference signal (DMRS) pattern for the PSSCH, the number of PSSCH DMRS ports, indexes of the PSSCH DMRS ports, or information about a second sidelink control information (SCI) format, based on the first signal being a physical sidelink control channel (PSCCH) and the second signal being the PSSCH.

In another aspect of the present disclosure, provided herein is a base station (BS) for allocating a resource pool to a user equipment (UE) in a wireless communication system supporting sidelink, including a radio frequency (RF) transceiver, and a processor connected to the RF transceiver. The processor is configured to receive a report on capability information including information about time latency or a time error related to a first interface from the UE by controlling the RF transceiver, configure a time gap for a resource pool based on the capability information, and transmit a signal for allocating the resource pool in which the time gap is configured to the UE. The first interface is an interface through which digital information is transferred between at least one distributed antenna unit and a central antenna unit, disposed in the UE, and the time gap is related to a transmission timing of a feedback signal based on reception of a physical sidelink shared channel (PSSCH).

A chipset receiving signals using at least one distributed antenna unit (DU) and a center antenna unit (CU) in a wireless communication system supporting sidelink, including at least one processor, and at least one memory operably connected to the at least one processor and causing, when executed, the at least one processor to perform operations. The operations include receiving a first signal and a second signal, using the at least one DU, delivering first information, which is decoding information for the first signal, from the at least one DU to the CU through a first interface, and decoding the second signal based on the first information using the CU. A feedback signal related to the second signal is transmitted based on a time gap configured for the second signal, and the time gap is configured in consideration of time latency or a time error related to the first interface.

The processor may control a traveling mode of a device connected to the chipset based on the second signal.

In another aspect of the present disclosure, provided herein is a computer-readable storage medium including at least one computer program that causes at least one processor to perform operations of receiving signals in a wireless communication system supporting sidelink. The at least one computer program causes the at least one processor to perform the operations of receiving signals using at least one distributed antenna unit (DU) and a center antenna unit (CU), the at least one computer program is stored in the computer-readable storage medium, wherein the operations include receiving a first signal and a second signal, using the at least one DU, delivering first information, which is decoding information for the first signal, from the at least one DU to the CU through a first interface, and decoding the second signal based on the first information using the CU, and a feedback signal related to the second signal is transmitted based on a time gap configured for the second signal, and the time gap is configured in consideration of time latency or a time error related to the first interface.

According to various embodiments, an increase in complexity of a distributed antenna unit (DU) may be minimized while minimizing cabling loss caused by an existing analog interface by distributing or splitting a decoding function of a physical layer between the DU and a central antenna unit (CU) through a first interface between the DU and the CU.

A time gap related to a transmission timing of a feedback signal related to a received signal may be configured in consideration of a latency time that may occur due to the first interface.

Effects to be achieved by embodiment(s) are not limited to what has been particularly described hereinabove and other effects not mentioned herein will be more clearly understood by persons skilled in the art to which embodiment(s) pertain from the following detailed description.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure.

DETAILED DESCRIPTION

Figure 1:
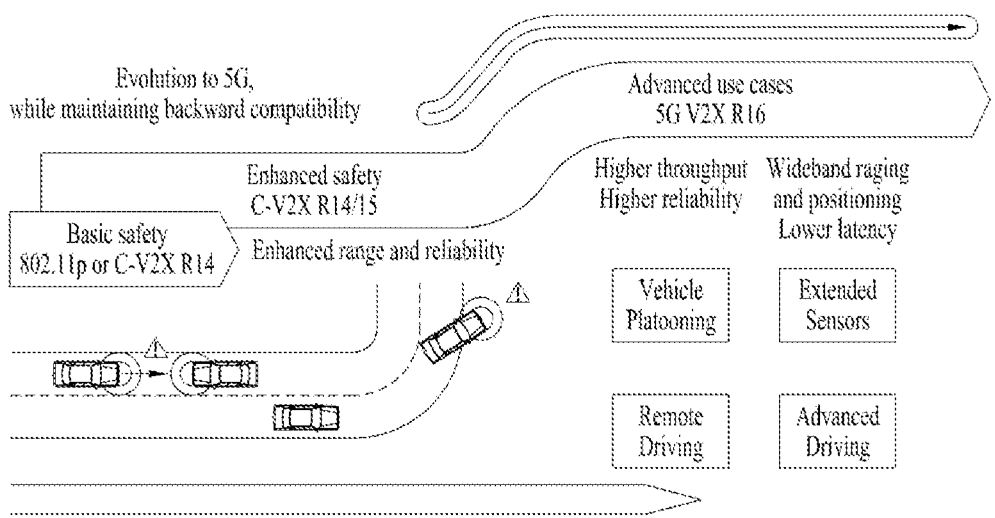
FIG. 1 is a diagram for explaining by comparing V2X communication based on RAT before NR and V2X communication based on NR.

The wireless communication system is a multiple access system that supports communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A, and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

Figure 2:
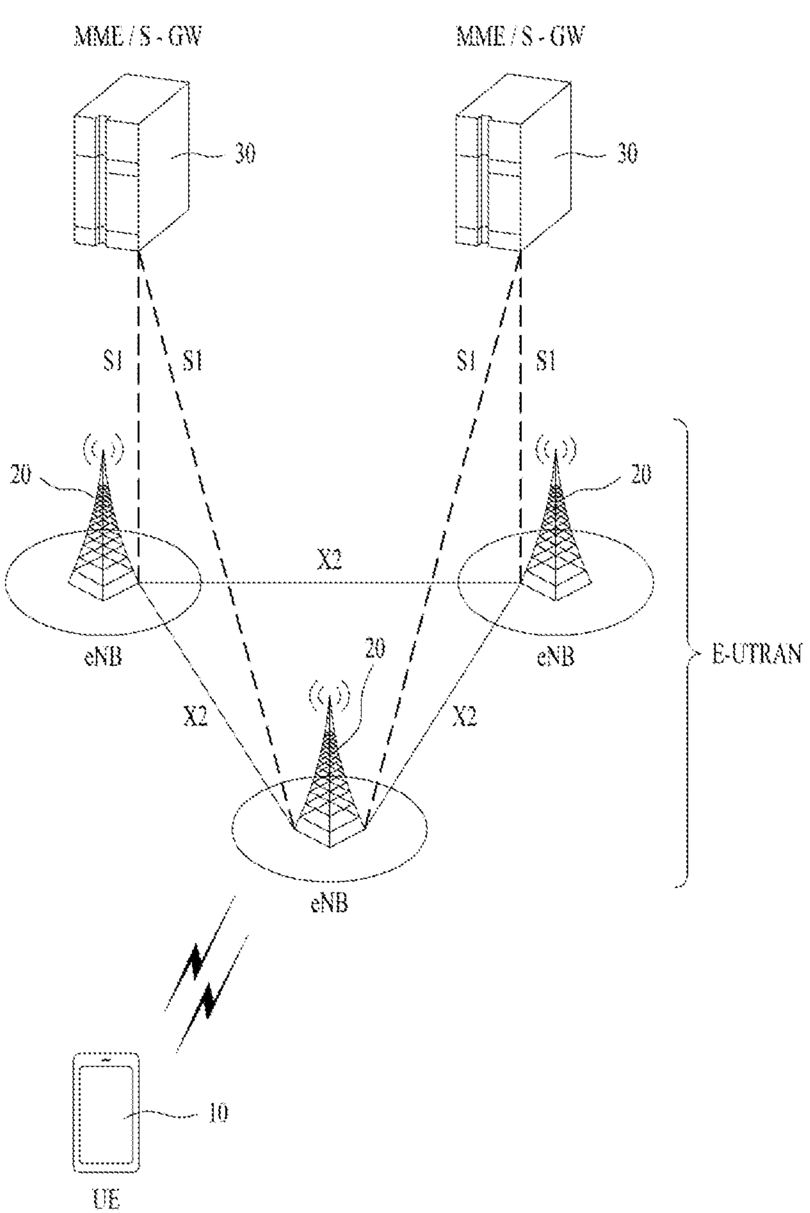
FIG. 2 illustrates the structure of an LTE system to which embodiment(s) are applicable.

For clarity of explanation, LTE-A or 5G NR is mainly described, but the technical spirit of the embodiment(s) is not limited thereto FIG. 2 illustrates the structure of an LTE system to which the present disclosure is applicable. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user terminal (UT), subscriber station (SS), mobile terminal (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
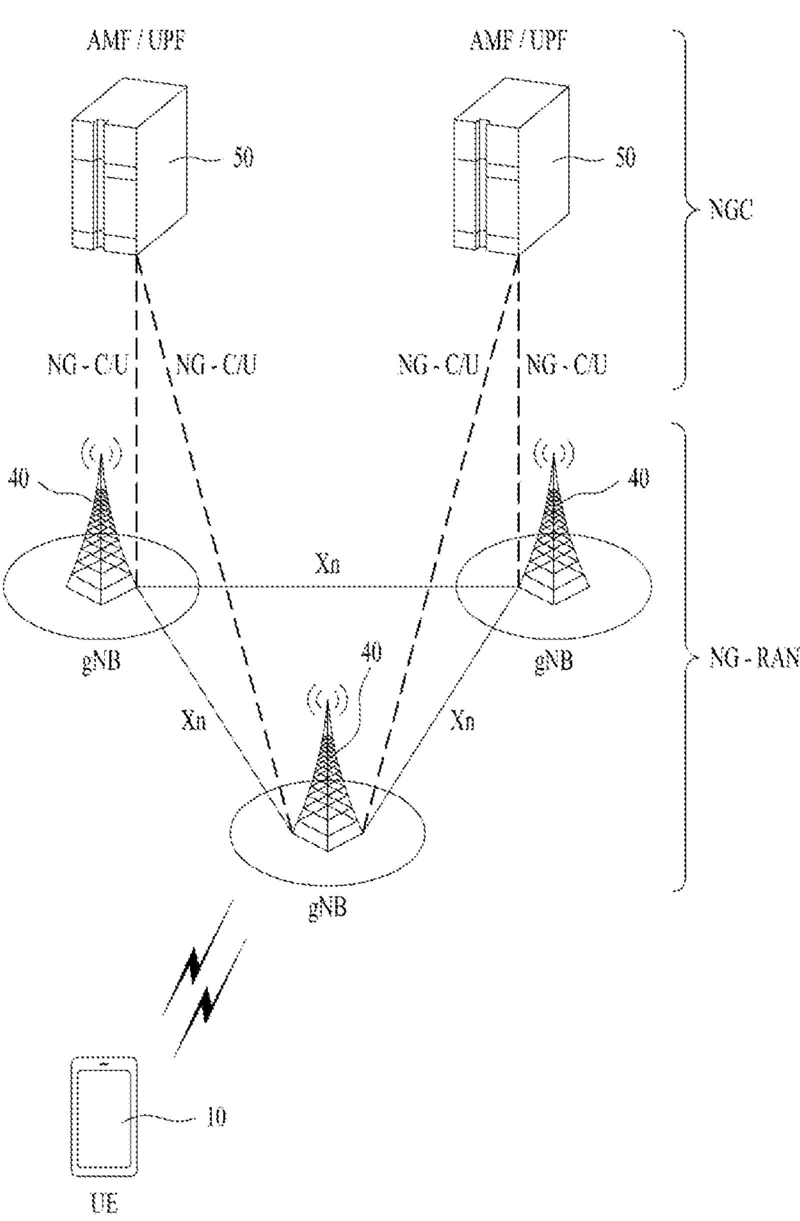
FIG. 3 illustrates the structure of an NR system to which embodiment(s) are applicable.

FIG. 3 illustrates the structure of a NR system to which the present disclosure is applicable.

Referring to FIG. 3, a next generation radio access network (NG-RAN) may include a next generation Node B (gNB) and/or an eNB, which provides user-plane and control-plane protocol termination to a UE. In FIG. 3, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

Figure 4:
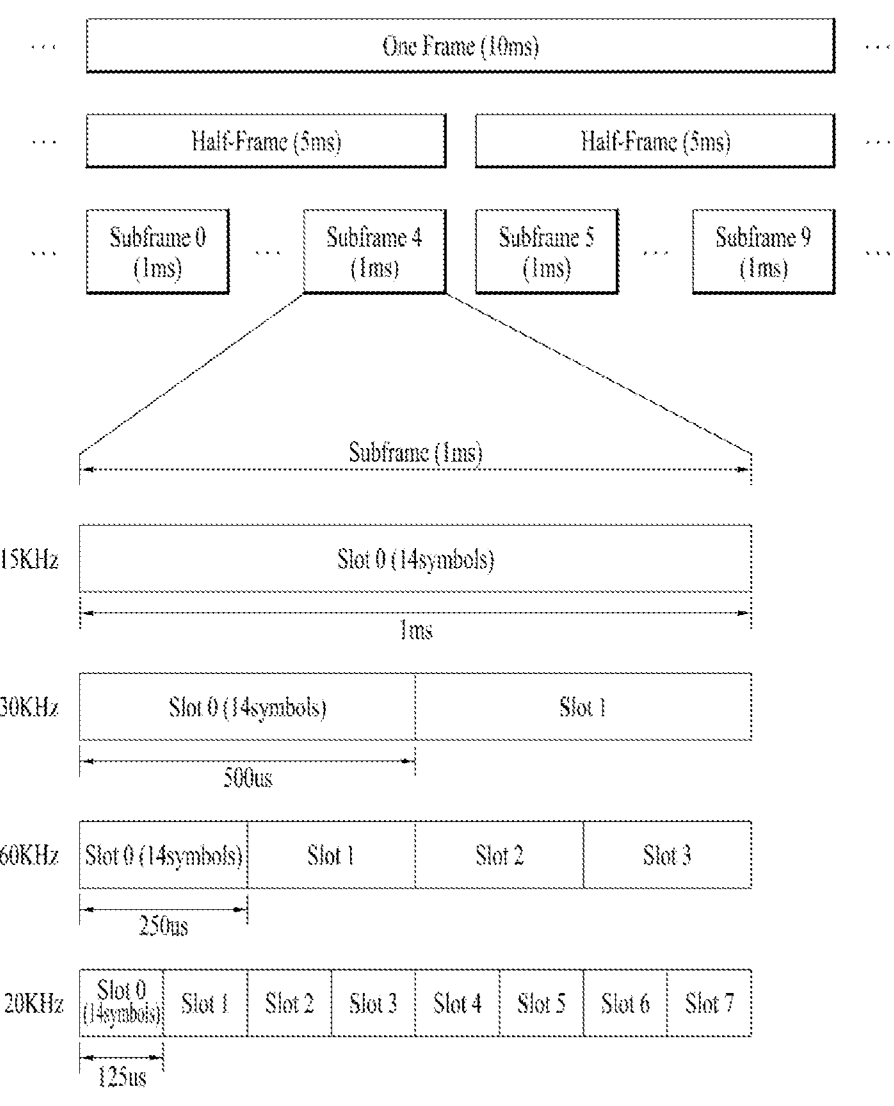
FIG. 4 illustrates the structure of an NR radio frame to which embodiment(s) are applicable.

FIG. 4 illustrates the structure of a NR radio frame to which the present disclosure is applicable.

Referring to FIG. 4, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,u}_{slot}$, and the number of slots per subframe $N^{subframe,u}_{slot}$ according to an SCS configuration μ in the NCP case.

TABLE 1

| SCS (15*2u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description).

In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6 GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
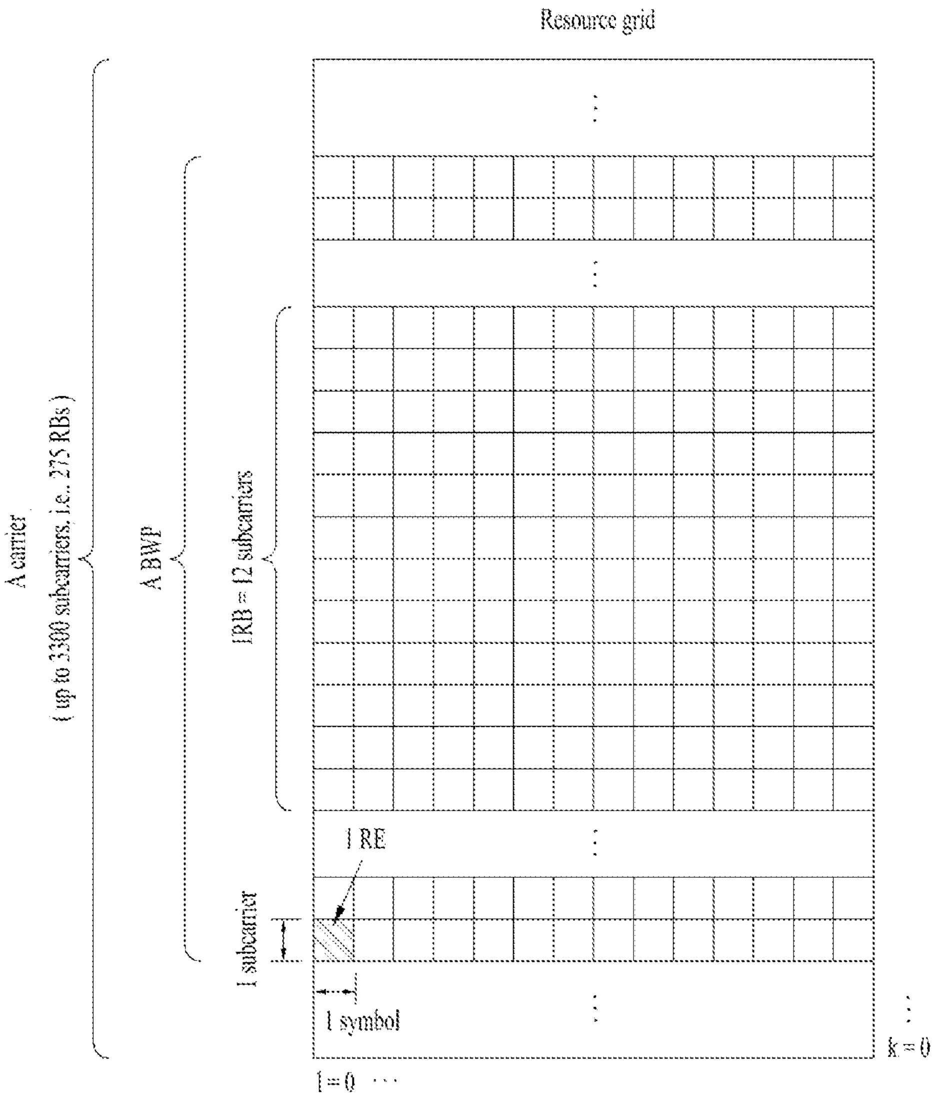
FIG. 5 illustrates the slot structure of an NR frame to which embodiment(s) are applicable.

FIG. 5 illustrates the slot structure of a NR frame to which the present disclosure is applicable.

Referring to FIG. 5, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

Figure 6:
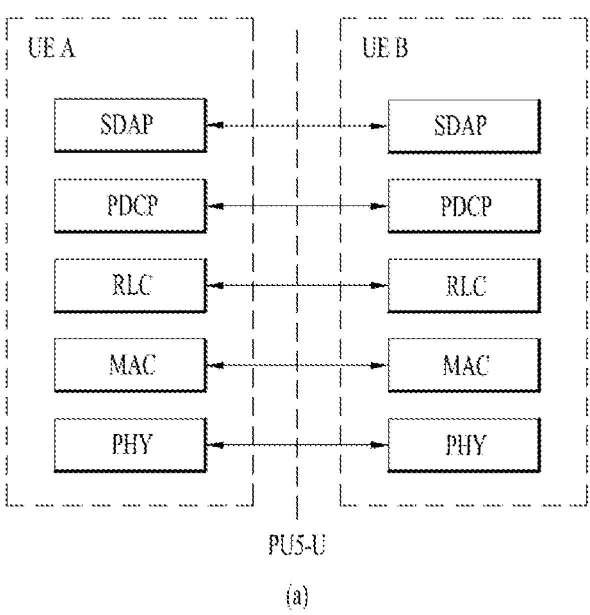
FIG. 6 illustrates a radio protocol architecture for SL communication.
Figure 6:
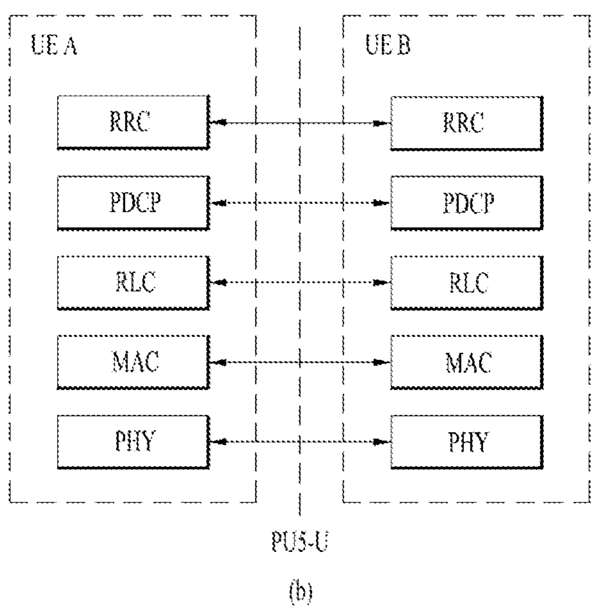

FIG. 6 illustrates a radio protocol architecture for SL communication. Specifically, FIG. 6-(*a*) shows a user plane protocol stack of NR, and FIG. 6-(*b*) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

A physical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre)set sidelink BWP (SL BWP). For example, the bandwidth of the S-SSB may be 11 resource blocks (RBs). For example, the PSBCH may span 11 RBs. The frequency position of the S-SSB may be (pre)set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be preconfigured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

Figure 7:
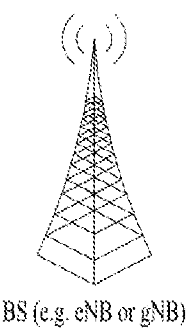
FIG. 7 illustrates UEs performing V2X or SL communication.
Figure 7:
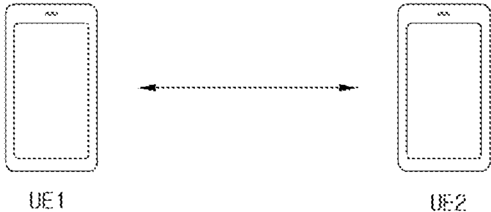

FIG. 7 illustrates UEs performing V2X or SL communication.

Referring to FIG. 7, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Figure 8:
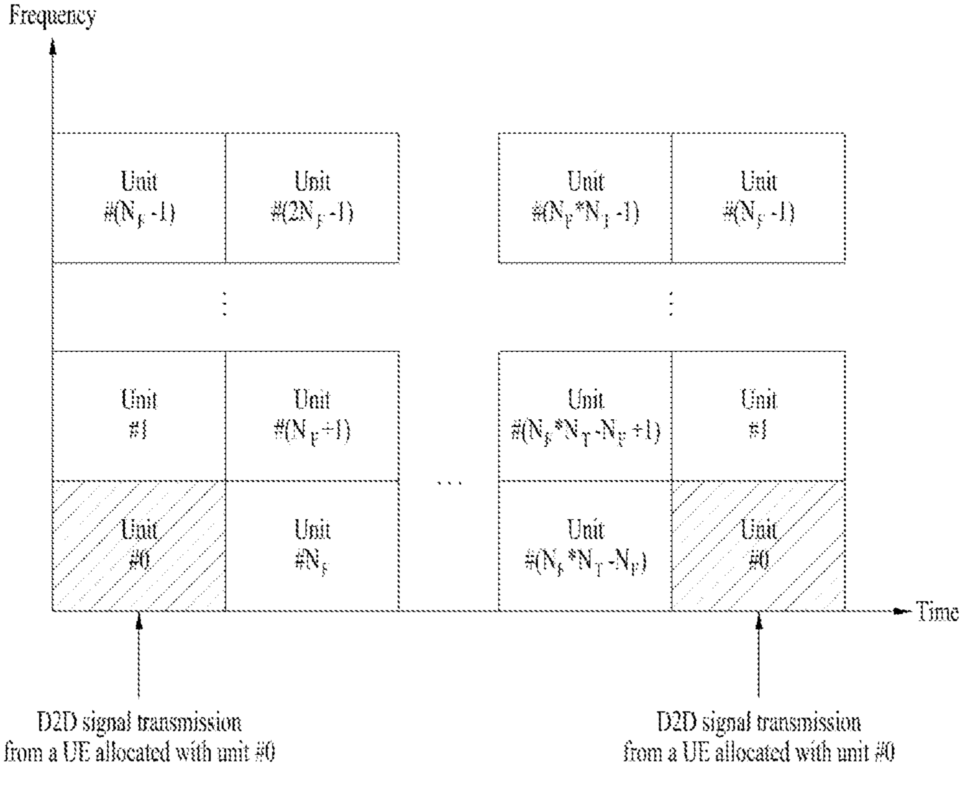
FIG. 8 illustrates resource units for V2X or SL communication.

FIG. 8 illustrates resource units for V2X or SL communication.

Referring to FIG. 8, the frequency resources of a resource pool may be divided into $N_F$ sets, and the time resources of the resource pool may be divided into $N_T$ sets. Accordingly, a total of $N_F*N_T$ resource units may be defined in the resource pool. FIG. 8 shows an exemplary case where the resource pool is repeated with a periodicity of $N_T$ subframes.

As shown in FIG. 8, one resource unit (e.g., Unit #0) may appear periodically and repeatedly. Alternatively, in order to obtain a diversity effect in the time or frequency dimension, an index of a physical resource unit to which one logical resource unit is mapped may change in a predetermined pattern over time. In this structure of resource units, the resource pool may represent a set of resource units available to a UE which intends to transmit an SL signal.

Resource pools may be subdivided into several types. For example, according to the content in the SL signal transmitted in each resource pool, the resource pools may be divided as follows.

(1) Scheduling assignment (SA) may be a signal including information such as a position of a resource through which a transmitting UE transmits an SL data channel, a modulation and coding scheme (MCS) or multiple input multiple output (MIMO) transmission scheme required for demodulation of other data channels, and timing advance (TA). The SA may be multiplexed with SL data and transmitted through the same resource unit. In this case, an SA resource pool may represent a resource pool in which SA is multiplexed with SL data and transmitted. The SA may be referred to as an SL control channel.

(2) SL data channel (physical sidelink shared channel (PSSCH)) may be a resource pool through which the transmitting UE transmits user data. When the SA and SL data are multiplexed and transmitted together in the same resource unit, only the SL data channel except for the SA information may be transmitted in the resource pool for the SL data channel. In other words, resource elements (REs) used to transmit the SA information in individual resource units in the SA resource pool may still be used to transmit the SL data in the resource pool of the SL data channel. For example, the transmitting UE may map the PSSCH to consecutive PRBs and transmit the same.

(3) The discovery channel may be a resource pool used for the transmitting UE to transmit information such as the ID thereof. Through this channel, the transmitting UE may allow a neighboring UE to discover the transmitting UE.

Even when the SL signals described above have the same content, they may use different resource pools according to the transmission/reception properties of the SL signals. For example, even when the SL data channel or discovery message is the same among the signals, it may be classified into different resource pools according to determination of the SL signal transmission timing (e.g., transmission at the reception time of the synchronization reference signal or transmission by applying a predetermined TA at the reception time), a resource allocation scheme (e.g., the BS designates individual signal transmission resources to individual transmitting UEs or individual transmission UEs select individual signal transmission resources within the resource pool), signal format (e.g., the number of symbols occupied by each SL signal in a subframe, or the number of subframes used for transmission of one SL signal), signal strength from a B S, the strength of transmit power of an SL UE, and the like. Hereinafter, resource allocation in the SL will be described.

Figure 9:
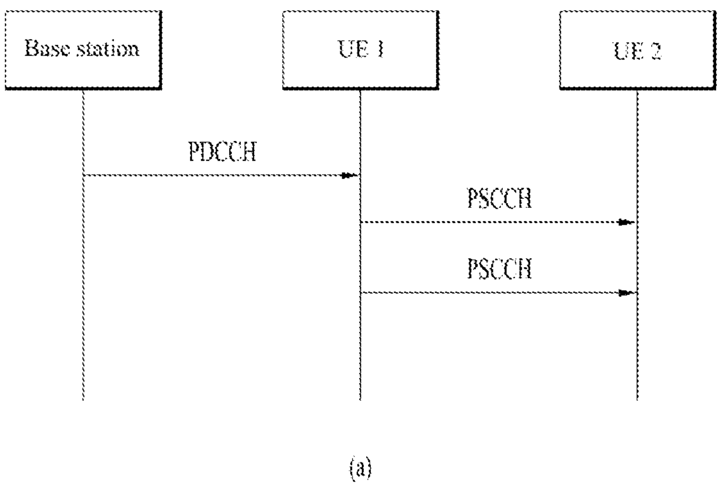
FIG. 9 illustrates a procedure in which UEs perform V2X or SL communication according to a transmission mode.
Figure 9:
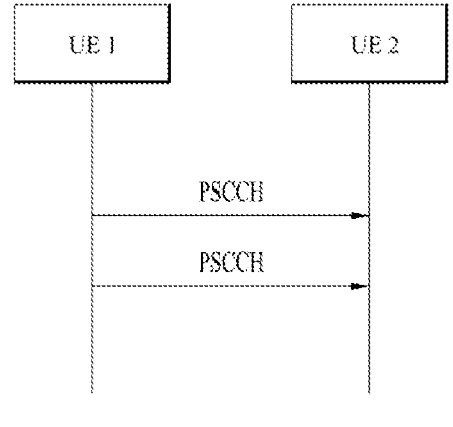

FIG. 9 illustrates a procedure in which UEs perform V2X or SL communication according to a transmission mode. In various embodiments of the present disclosure, the transmission mode may be referred to as a mode or a resource allocation mode. Hereinafter, for simplicity, the transmission mode in LTE may be referred to as an LTE transmission mode, and the transmission mode in NR may be referred to as an NR resource allocation mode.

For example, FIG. 9-(*a*) illustrates a UE operation related to LTE transmission mode 1 or LTE transmission mode 3. Alternatively, for example, FIG. 9-(*a*) illustrates a UE operation related to NR resource allocation mode 1. For example, LTE transmission mode 1 may be applied to general SL communication, and LTE transmission mode 3 may be applied to V2X communication.

For example, FIG. 9-(*b*) illustrates a UE operation related to LTE transmission mode 2 or LTE transmission mode 4. Alternatively, for example, FIG. 9-(*b*) illustrates a UE operation related to NR resource allocation mode 2.

Referring to FIG. 9-(*a*), in LTE transmission mode 1, LTE transmission mode 3 or NR resource allocation mode 1, the BS may schedule an SL resource to be used by the UE for SL transmission. For example, the BS may perform resource scheduling for UE 1 through PDCCH (more specifically, downlink control information (DCI)), and UE 1 may perform V2X or SL communication with UE 2 according to the resource scheduling. For example, UE 1 may transmit sidelink control information (SCI) to UE 2 on a physical sidelink control channel (PSCCH), and then transmit data which is based on the SCI to UE 2 on a physical sidelink shared channel (PSSCH).

For example, in NR resource allocation mode 1, the UE may be provided with or allocated resources for one or more SL transmissions of a transport block (TB) from the BS through a dynamic grant. For example, the BS may provide a resource for transmission of the PSCCH and/or PSSCH to the UE using the dynamic grant. For example, the transmitting UE may report the SL hybrid automatic repeat request (HARQ) feedback received from the receiving UE to the BS. In this case, the PUCCH resource and timing for reporting the SL HARQ feedback to the BS may be determined based on an indication in the PDCCH through the BS is to allocate a resource for SL transmission.

For example, DCI may include a slot offset between DCI reception and the first SL transmission scheduled by the DCI. For example, the minimum gap between the DCI scheduling a SL transmission resource and the first scheduled SL transmission resource may not be shorter than the processing time of the corresponding UE.

For example, in NR resource allocation mode 1, the UE may be periodically provided with or allocated a resource set from the BS for a plurality of SL transmissions through a configured grant. For example, the configured grant may include configured grant type 1 or configured grant type 2. For example, the UE may determine a TB to be transmitted in each occasion indicated by a given configured grant.

For example, the BS may allocate SL resources to the UE on the same carrier, and may allocate SL resources to the UE on different carriers.

For example, an NR BS may control LTE-based SL communication. For example, the NR BS may transmit NR DCI to the UE to schedule an LTE SL resource. In this case, for example, a new RNTI for scrambling the NR DCI may be defined. For example, the UE may include an NR SL module and an LTE SL module.

For example, after the UE including the NR SL module and the LTE SL module receives NR SL DCI from the gNB, the NR SL module may transform the NR SL DCI to LTE DCI type 5A, and the NR SL module may deliver LTE DCI type 5A to the LTE SL module in units of X ms. For example, the LTE SL module may apply activation and/or release to the first LTE subframe Z ms after the LTE SL module receives LTE DCI format 5A from the NR SL module. For example, the X may be dynamically indicated using a field of DCI. For example, the minimum value of X may depend on the UE capability. For example, the UE may report a single value according to the UE capability. For example, X may be a positive number.

Referring to FIG. 9-(*b*), in LTE transmission mode 2, LTE transmission mode 4, or NR resource allocation mode 2, the UE may determine AN SL resource within the SL resources configured by the B S/network or the preconfigured SL resources. For example, the configured SL resources or the preconfigured SL resources may be a resource pool. For example, the UE may autonomously select or schedule a resource for SL transmission. For example, the UE may autonomously select a resource within the configured resource pool to perform SL communication. For example, the UE may select a resource within a selection window by performing a sensing and resource (re)selection procedure. For example, the sensing may be performed on a per sub-channel basis. In addition, UE 1, which has selected a resource within the resource pool, may transmit SCI to UE 2 through the PSCCH, and then transmit data, which is based on the SCI, to UE 2 through the PSSCH.

For example, a UE may assist in selecting an SL resource for another UE. For example, in NR resource allocation mode 2, the UE may receive a configured grant for SL transmission. For example, in NR resource allocation mode 2, the UE may schedule SL transmission of another UE. For example, in NR resource allocation mode 2, the UE may reserve an SL resource for blind retransmission.

For example, in NR resource allocation mode 2, UE 1 may indicate the priority of SL transmission to UE 2 using the SCI. For example, UE 2 may decode the SCI. UE 2 may perform sensing and/or resource (re)selection based on the priority. For example, the resource (re)selection procedure may include an operation of identifying candidate resources in a resource selection window by UE 2, and an operation of selecting, by UE 2, a resource for (re)transmission from among the identified candidate resources. For example, the resource selection window may be a time interval during which the UE selects the resource for SL transmission. For example, after UE 2 triggers resource (re)selection, the resource selection window may start at T1≥0. The resource selection window may be limited by the remaining packet delay budget of UE 2. For example, in the operation of identifying the candidate resources in the resource selection window by UE 2, a specific resource may be indicated by the SCI received by UE 2 from UE 1. When the L1 SL RSRP measurement value for the specific resource exceeds an SL RSRP threshold, UE 2 may not determine the specific resource as a candidate resource. For example, the SL RSRP threshold may be determined based on the priority of the SL transmission indicated by the SCI received by UE 2 from UE 1 and the priority of the SL transmission on the resource selected by UE 2.

For example, the L1 SL RSRP may be measured based on an SL demodulation reference signal (DMRS). For example, one or more PSSCH DMRS patterns may be configured or preconfigured for each resource pool in the time domain. For example, PDSCH DMRS configuration type 1 and/or type 2 may be the same as or similar to the frequency domain pattern of the PSSCH DMRS. For example, the exact DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, based on the sensing and resource (re)selection procedure, the transmitting UE may perform initial transmission of a TB without reservation. For example, based on the sensing and resource (re)selection procedure, using the SCI associated with a first TB, the transmitting UE may reserve the SL resource for initial transmission of a second TB.

For example, in NR resource allocation mode 2, the UE may reserve a resource for feedback-based PSSCH retransmission through signaling related to previous transmission of the same TB. For example, the maximum number of SL resources reserved by one transmission including the current transmission may be 2, 3, or 4. For example, the maximum number of SL resources may be the same regardless of whether HARQ feedback is enabled. For example, the maximum number of HARQ (re)transmissions for one TB may be limited by configuration or pre-configuration. For example, the maximum number of HARQ (re)transmissions may be up to 32. For example, when the configuration or pre-configuration is not present, the maximum number of HARQ (re)transmissions may be unspecified. For example, the configuration or pre-configuration may be for the transmitting UE. For example, in NR resource allocation mode 2, HARQ feedback for releasing resources not used by the UE may be supported.

For example, in NR resource allocation mode 2, the UE may indicate to another UE one or more sub-channels and/or slots used by the UE, using the SCI. For example, the UE may indicate to another UE one or more sub-channels and/or slots reserved by the UE for PSSCH (re)transmission, using SCI. For example, the minimum allocation unit of the SL resource may be a slot. For example, the size of the sub-channel may be configured for the UE or may be preconfigured.

Hereinafter, sidelink control information (SCI) will be described.

Control information transmitted by the BS to the UE on the PDCCH may be referred to as downlink control information (DCI), whereas control information transmitted by the UE to another UE on the PSCCH may be referred to as SCI. For example, before decoding the PSCCH, the UE may be aware of the start symbol of the PSCCH and/or the number of symbols of the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, when the SCI configuration fields are divided into two groups in consideration of the (relatively) high SCI payload size, the SCI including a first SCI configuration field group may be referred to as first SCI or 1st SCI, and the SCI including a second SCI configuration field group may be referred to as second SCI or 2nd SCI. For example, the transmitting UE may transmit the first SCI to the receiving UE on the PSCCH. For example, the transmitting UE may transmit the second SCI to the receiving UE on the PSCCH and/or the PSSCH. For example, the second SCI may be transmitted to the receiving UE on the (independent) PSCCH, or may be piggybacked together with data and transmitted on the PSSCH. For example, the two consecutive SCIs may be applied for different transmissions (e.g., unicast, broadcast, or groupcast).

For example, the transmitting UE may transmit some or all of the following information to the receiving UE through SCI. Here, for example, the transmitting UE may transmit some or all of the following information to the receiving UE through the first SCI and/or the second SCI:

PSSCH and/or PSCCH related resource allocation information, for example, the positions/number of time/frequency resources, resource reservation information (e.g., periodicity); and/or SL CSI report request indicator or SL (L1) RSRP (and/or SL (L1) RSRQ and/or SL (L1) RSSI) report request indicator; and/or SL CSI transmission indicator (or SL (L1) RSRP (and/or SL (L1) RSRQ and/or SL (L1) RSSI) information transmission indicator) (on PSSCH); and/or MCS information; and/or transmit power information; and/or L1 destination ID information and/or L1 source ID information; and/or SL HARQ process ID information; and/or new data indicator (NDI) information; and/or redundancy version (RV) information; and/or (transmission traffic/packet related) QoS information; e.g., priority information; and/or SL CSI-RS transmission indicator or information on the number of (transmitted) SL CSI-RS antenna ports;

Location information about the transmitting UE or location (or distance/area) information about a target receiving UE (to which a request for SL HARQ feedback is made); and/or information about a reference signal (e.g., DMRS, etc.) related to decoding and/or channel estimation of data transmitted on the PSSCH, for example, information related to a pattern of a (time-frequency) mapping resource of DMRS, rank information, antenna port index information.

For example, the first SCI may include information related to channel sensing. For example, the receiving UE may decode the second SCI using the PSSCH DMRS. A polar code used for the PDCCH may be applied to the second SCI. For example, in the resource pool, the payload size of the first SCI may be the same for unicast, groupcast and broadcast. After decoding the first SCI, the receiving UE does not need to perform blind decoding of the second SCI. For example, the first SCI may include scheduling information about the second SCI.

In various embodiments of the present disclosure, since the transmitting UE may transmit at least one of SCI, the first SCI, and/or the second SCI to the receiving UE on the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE on the PSSCH, the PSSCH may be replaced/substituted with the second SCI.

Hereinafter, synchronization acquisition by an SL UE will be described.

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Hybrid Automatic Repeat Request (HARQ) is the combination of FEC and ARQ, and can improve performance by checking whether data received by a physical layer contains an error that cannot be decoded, and requesting retransmission if an error occurs.

In case of sidelink unicast and groupcast, HARQ feedback and HARQ combining in a physical layer may be supported. For example, when an Rx UE operates in resource allocation mode 1 or 2, the Rx UE may receive PSSCH from a Tx UE, and the Rx UE may transmit HARQ-ACK feedback on the PSSCH to the Tx UE using a Sidelink Feedback Control Information (SFCI) format through Physical Sidelink Control Channel (PSFCH).

When side link HARQ feedback is enabled for unicast, in case of a non-Code Block Group (non-CBG) operation, when the Rx UE successfully decodes a corresponding transport block, the Rx UE may generate HARQ-ACK. Then, the Rx UE may transmit the HARQ-ACK to the Tx UE. After the Rx UE has decoded an associated PSCCH targeting the Rx UE, if the Rx UE fails to successfully decode the corresponding transport block, the Rx UE may generate HARQ-NACK. Then, the Rx UE may transmit the HARQ-NACK to the Tx UE.

When side link HARQ feedback is enabled for groupcast, a UE may determine whether to send HARQ feedback based on a Tx-Rx distance and/or RSRP. In case of a non-CBG operation, two kinds of options may be supported.

(1) Option 1: When an Rx UE fails to decode a corresponding transport block after decoding an associated PSCCH, the Rx UE may transmit HARQ-NACK on PSFCH. Otherwise, the Rx UE may not transmit a signal on PSFCH.

(2) Option 2: When an Rx UE successfully decodes a corresponding transport block, the Rx UE may transmit HARQ-ACK on PSFCH. When the Rx UE fails to decode the corresponding transport block successfully after decoding an associated PSCCH targeting the Rx UE, the Rx UE may transmit HARQ-NACK on PSFCH.

In case of mode 1 resource allocation, the time between HARQ feedback transmission on PSFCH and PSSCH may be set (in advance). In case of unicast and groupcast, if retransmission in sidelink is required, it may be indicated to a BS by an in-coverage UE that uses PUCCH. A Tx UE may transmit an indication to a serving BS of the Tx UE in a form such as a Scheduling Request/Buffer Status Report (SR/BSR) rather than a form of HARQ ACK/NACK. In addition, even if the BS does not receive the indication, the BS may schedule a side link retransmission resource to the UE.

In case of mode 2 resource allocation, the time between HARQ feedback transmission on PSFCH and PSSCH may be set (in advance).

Hereinafter, sidelink congestion control will be described.

When a UE determines a sidelink Tx resource by itself, the UE also determines a size and frequency of a resource used by the UE. Of course, due to constraints from a network, etc., using a resource size or frequency of a predetermined level or higher may be limited. However, when all UEs use relatively large resources in a situation that many UEs are concentrated in a specific area at a specific timing, overall performance may be considerably due to mutual interference.

Accordingly, a UE needs to observe a channel situation. If it is determined that an excessive amount of resources are being consumed, it is preferable that the UE takes an operation in the form of reducing its own resource use. In the present specification, this may be defined as Congestion Control (CR). For example, a UE may determine whether the energy measured in a unit time/frequency resource is equal to or higher than a predetermined level, and adjust an amount and frequency of its Tx resource according to a ratio of the unit time/frequency resource from which the energy equal to or higher than the predetermined level is observed. In the present specification, the ratio of the time/frequency resources from which the energy equal to or higher than the predetermined level is observed may be defined as a Channel Busy Ratio (CBR). The UE may measure the CBR with respect to a channel/frequency. Additionally, the UE may transmit the measured CBR to a network/BS.

Distributed Antenna Array for Vehicular Communication

Hereinafter, a communication system based on distributed antenna units and a central antenna unit will be described in detail.

As the number of uses of wireless communication by a user increases and service categories using wireless communication increase, the necessity of supporting higher data rate and higher quality of service (QoS) for a high-speed mobile user than those conventionally provided has emerged. For example, if multiple users desire to watch multimedia content while using public transportation or when multiple passengers in a private vehicle driving on an expressway use different wireless communication services, a mobile communication system needs to support high-quality wireless services for the above users.

This is a new model that has not existed in a conventional wireless communication service model. To support the new model, a mobile communication network needs to be improved to a revolutionary extent or a new system capable of implementing the new model without affecting network infrastructure needs to be designed. As one method for solving the above object, a vehicular MIMO system in which a large-sized antenna array is installed at a vehicle so that the vehicle may receive a high-quality service through large array gain while traveling at a high speed and a central antenna unit of the vehicle relays received data to passengers in the vehicle is under consideration.

As described above, when the large-sized array antenna or a distributed antenna unit system is installed at the exterior of a vehicle and wireless communication between a BS and passengers in the vehicle is relayed therethrough, ① communication performance degradation caused by penetration loss having an average of about 20 dB may be prevented. ② large array gain may be secured by using many reception (Rx) antennas relative to personal portable communication devices, and ③ Rx diversity is easily obtained because the distance between Rx antennas is easily secured.

Due to the above characteristics, vehicular MIMO enables users to receive an excellent communication service relative to a personal portable device without additional investment in infrastructure.

In spite of these advantages, there is no example of installing a large antenna array in a vehicle. Since a vehicle is considerably expensive equipment relative to an existing personal portable communication device, it is not easy to improve and upgrade the vehicle. Further, since the vehicle should satisfy more requirements including design concept and an aerodynamic structure in addition to communication performance, it is not easy to install the large antenna array that limits the design of the vehicle in terms of aesthetics/aerodynamics. In reality, vehicle manufacturers are using a combination antenna, performance of which deteriorates relative to a single antenna, in order to remove visual inconvenience of an existing antenna.

In this regard, in order to solve spatial limitations of the large array antenna, installation of a distributed antenna array system at a vehicle has been considered to implement an arrayed antenna system not through a single array but through multiple arrays.

Figure 10:
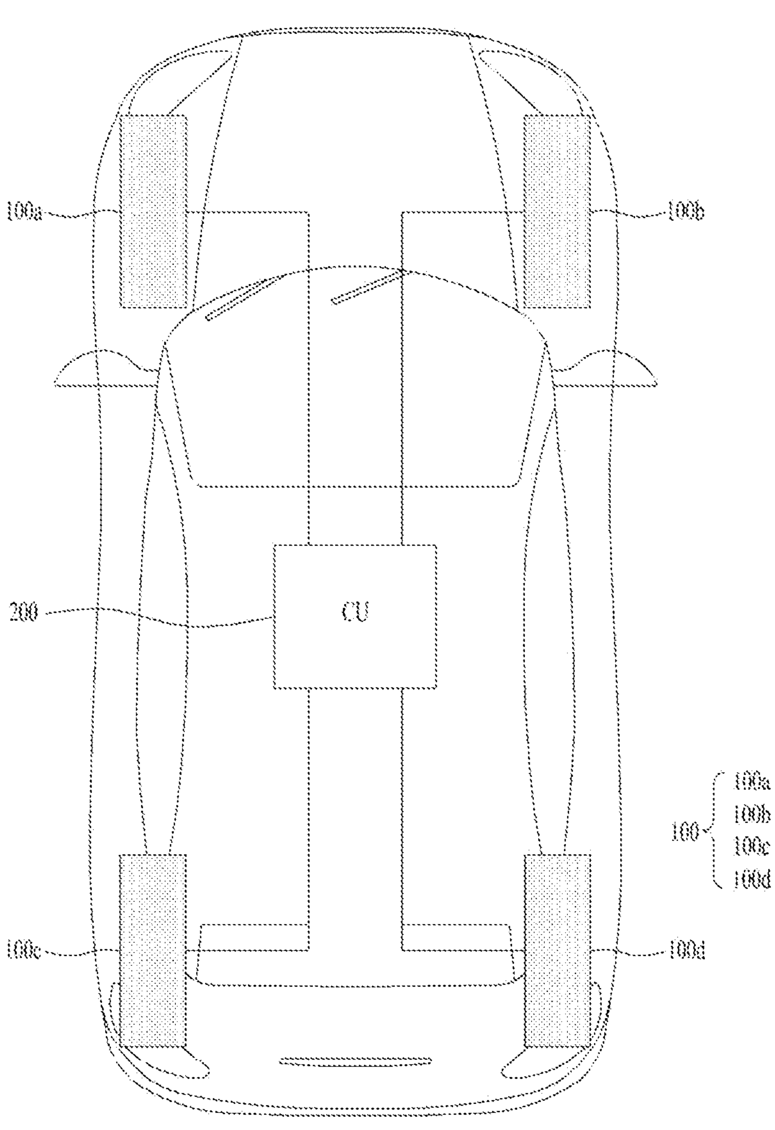
FIG. 10 is a diagram for explaining a distributed antenna unit system provided in a V2X vehicle.

FIG. 10 is a diagram for explaining a distributed antenna unit system provided in a V2X vehicle.

Referring to FIG. 10, a vehicular communication device 10 may include a plurality of distributed antenna units (DUs) 100, and a central antenna or central antenna unit (CU) 200 controlling the plurality of DUs.

The plurality of DUs 100 may be connected to the CU 200 by wire. Alternatively, the plurality of DUs 100 may be connected to the CU 200 wirelessly. Alternatively, the plurality of DUs 100 may transmit signals to an external device through a mobile communication network. Here, the external device may include at least one of a mobile terminal, another vehicle, or a server, located outside the vehicle.

Each of the plurality of DUs 100 may be attached to or disposed at a vehicle body in a distributed manner. For example, each of the plurality of DUs may be distributively attached to a portion of at least one of a hood, a roof, a trunk, a front windshield, a rear windshield, or a side mirror of the vehicle body. Alternatively, each of the plurality of DUs 100 may be attached to a portion of at least one of the hood, the roof, the trunk, the front windshield, the rear windshield, or the side mirror of the vehicle body facing the sky. Alternatively, each of the plurality of DUs 100 may be attached to a portion of at least one of the hood, the roof, the trunk, the front windshield, the rear windshield, or the side mirror of the vehicle body in a direction opposite to a direction toward the ground.

Each of the plurality of DUs 100 has excellent transmit/receive power performance as each DU is positioned at an upper end of the vehicle body. In addition, a MIMO system may be implemented due to a plurality of array antennas included in each of the plurality of DUs 100. When such a MIMO system is implemented, communication capacity (e.g., communication data capacity) is increased.

The plurality of DUs 100 may include a first DU 100*a*, a second DU 100*b*, a third DU 100*c*, and a fourth DU 100*c*.

According to an embodiment, the plurality of DUs 100 may include 2, 3, 5 or more DUs. Meanwhile, each of the plurality of DUs 100 may receive a reception signal from the same external device through different frequency bands.

For example, the plurality of DUs 100 may include the first DU 100*a* and the second DU 100*b*. The first DU 100*a* may receive an Rx signal from a first server through a first frequency band. The second DU 100*b* may receive an Rx signal from the first server through a second frequency band.

Meanwhile, each of the plurality of DUs 100 may receive an Rx signal from the same external device through different time bands.

For example, the plurality of DUs 100 may include the first DU 100*a* and the second DU 100*b*. The first DU 100*a* may receive an Rx signal from the first server through a first time band. The second DU 100*b* may receive an Rx signal from the first server through a second time band.

The CU 200 may integrally control the plurality of DUs 100. The CU 200 may control each of the plurality of DUs 100. The CU 200 may be connected to the plurality of DUs 100 by wire. The CU 200 may be connected to the plurality of DUs 100 wirelessly. The CU 200 may provide data based on signals received through the plurality of DUs 100 to one or more devices located in the vehicle. For example, the CU 200 may provide data based on signals received through the plurality of DUs 100 to mobile terminals possessed by one or more passengers.

The device located in the vehicle may be a mobile terminal that is located in the vehicle and is possessed by a passenger. The device located in the vehicle may be a user interface device provided in the vehicle. The user interface device is a device for communication between the vehicle and a user. The user interface device may receive a user input signal and provide information generated from the vehicle to the user. The vehicle 100 may implement a user interface (UI) or user experience (UX) through the user interface device.

The user interface device conceptually includes a navigation device, an audio video, navigation (AVN), a center integrated display (CID), a head up display (HUD), and a cluster.

Generally, in a functional/hierarchical aspect of communication, a terminal or a user (or a UE) includes a remote radio head (RRH) (including an RF entity and an analog-to-digital converter (ADC)/digital-to-analog converter (DAC)), a modem (including PHY, MAC, RLC, PDCP, RRC, and NAS layers), and an application processor (AP). The function of a part named DU in the vehicle distributed antenna system may be considered in various ways according to a DU-CU function sharing scenario. That is, the remote unit (RU) or the DU may generally serve only as an antenna (RF or RRH) module among the functions/layers of the UE but additionally assign a portion of not only the RF function but also the functions of the UE to each DU to perform specific processing and combine signals processed by the DU with signals of the CU.

Therefore, in the case of the vehicle antenna system or the vehicle distributed antenna system, the level of difficulty of RF implementation may be reduced (according to the DU-CU implementation scenario) or implementation gain of resolving a DU-CU cabling issue may be obtained, by properly distributing and allocating functional/hierarchical modules of a UE to the DUs and the CU. For example, 4 different implementation options may be broadly considered as follows, depending on how many functional/hierarchical modules of the UE are distributed in the DU.

Implementation options for a distributed antenna system (DAS) may be classified into 4 groups according to "level of distribution function of DU", and a reference model of each implementation option is described below.

Figure 11:
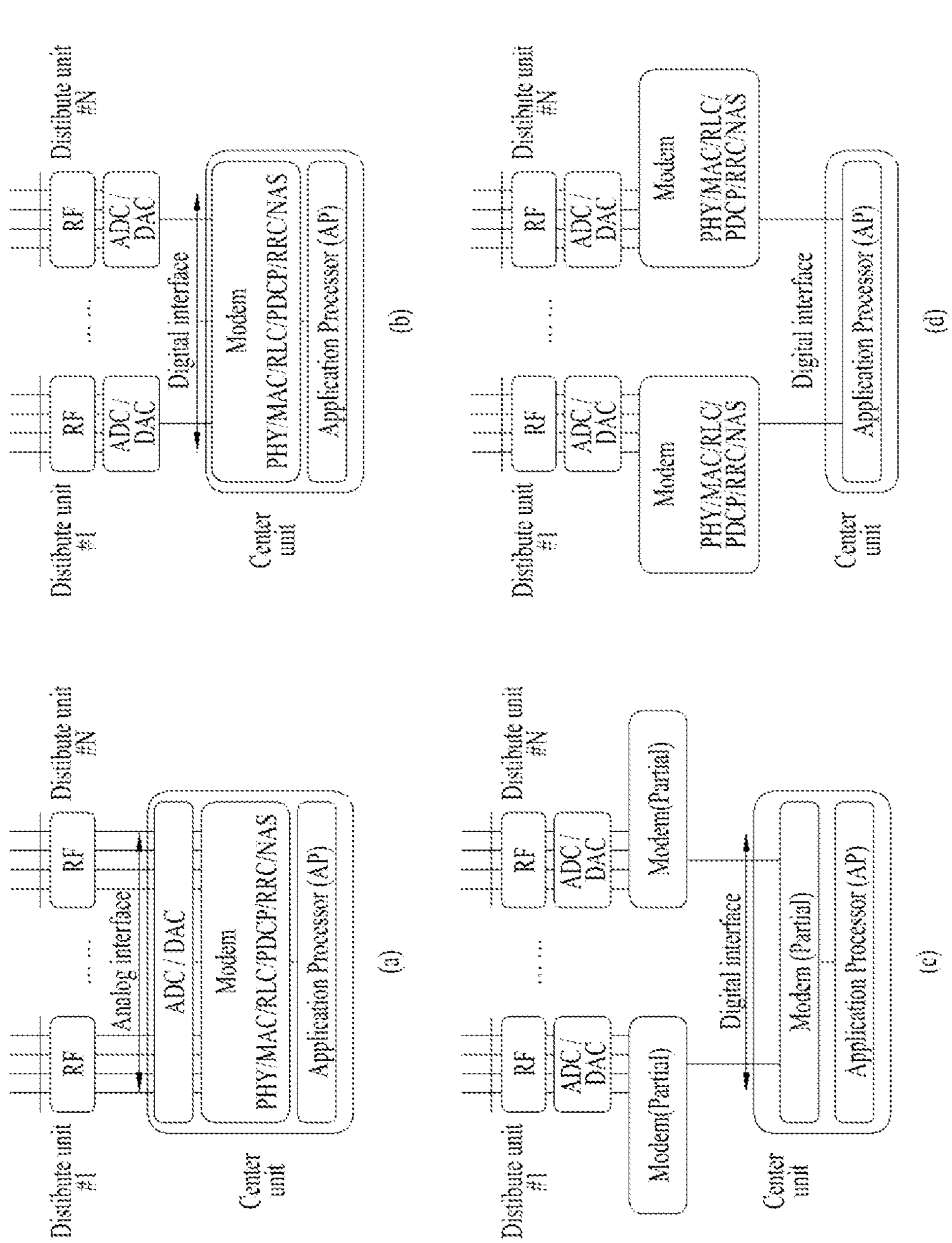
FIGS. 11 and 12 are diagrams for explaining implementation options for a DAS.
Figure 12:
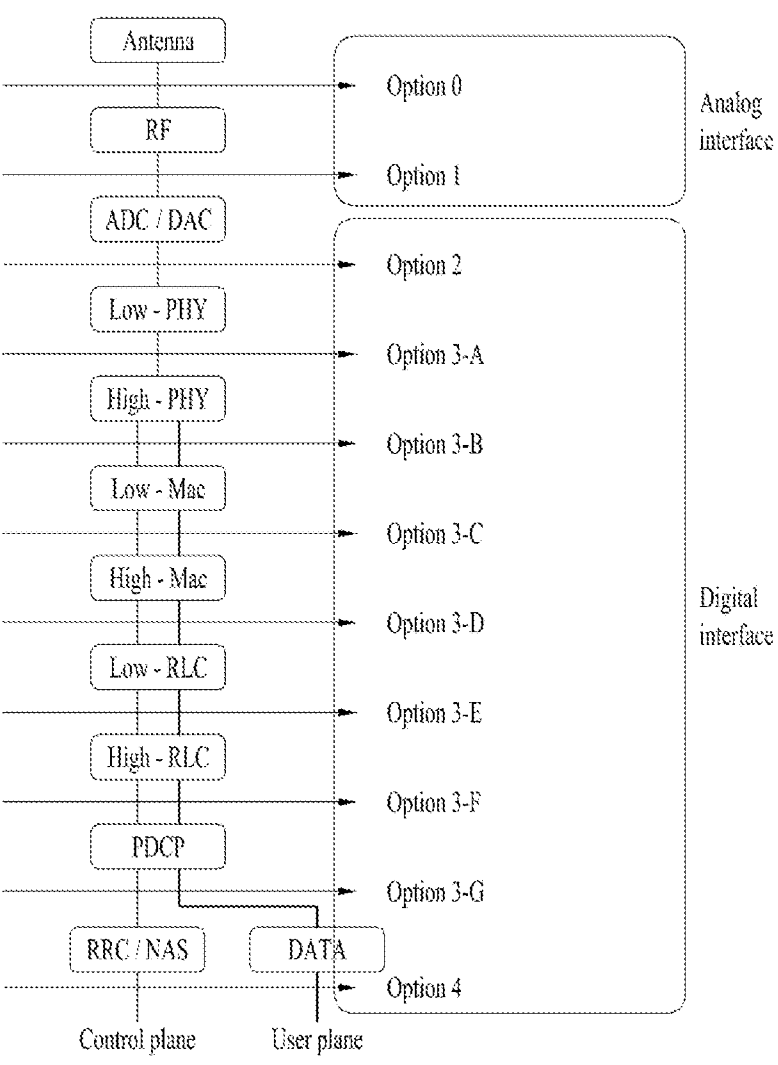

FIGS. 11 and 12 are diagrams for explaining implementation options for a DAS.

The implementation options for the DAS may include Option 1, Option 2, Option 3, and Option 4.

Referring to FIG. 11(*a*), as a reference model corresponding to Option 1, a DU may include only an RF module. In Option 1, an analog interface between a distribution unit (or a distributed antenna unit) (DU) and a central unit (or a central antenna unit) (CU) is considered. In relation to the analog interface, conversion to an intermediate frequency (IF) band may also be considered.

Specifically, in Option 1, only an RF module is distributed to each DU, and an analog signal may be transmitted from each DU to a CU using an analog interface. Before transmitting the analog signal, the distributed RF module may convert a signal (or an Rx signal) into an IF band signal to reduce cabling loss.

Referring to FIG. 11(*b*), as a reference model corresponding to Option 2, each DU may include an ADC, a DAC, and an RF module (or RF entity).

Additional functional blocks for controlling automatic gain control (AGC) and automatic frequency control (AFC) deployed individually may be included or required in each DU. The additional functional blocks may be implemented at the DU side in a parallel and distributed manner or at the CU side in a centralized manner. A digital interface may be used or adopted between each DU and the CU.

Referring to FIG. 11(*c*), as a reference model corresponding to option 3, each DU may include an RF entity, an ADC/DAC, and a partial modem stack (L1/L2). For example, the function of physical layer operation (or physical layer and MAC layer operation) of a modem may be implemented in each DU using the RF entity and the ADC/DAC, and the remaining functions of the modem may be implemented in the CU. In the case of Option 3, a digital interface between each DU and the CU may be used.

Referring to FIG. 11(*d*), as a reference model corresponding to Option 4, each DU may include an RF entity, an ADC/DAC, and a modem (all modem functions). Signals processed by an individual modem in each DU may be transmitted to a CU (application processor (AP)) via a digital interface.

Table 5 summarizes the contents of the above options.

TABLE 5

| | Description |
|---|---|
| Option 1 | Only RF modules are distributed. Analog interface between distributed unit and center unit is considered. * For this interface, conversion to IF (Intermediate Frequency) bands also can be considered |
| Option 2 | ADC/DAC and RF entities are distributed. Digital interface between distributed unit and center unit is considered. |
| Option 3 | Partial L1/L2 modem stacks, ADC/DAC and RF entities are distributed. Digital interface between distributed unit and center unit is considered. |
| Option 4 | Entire modem stacks and RF entities are distributed. Digital interface between distributed unit and center unit is considered. |

Options 1, 2 and 4 above may have characteristics and advantages/disadvantages as shown in Table 6 below.

TABLE 6

| | |
|---|---|
| Option 0: Antenna-RF split | Only antennas are in the DU and the other functionalities are in the CU. Extending the (copper) cabling between the antenna and RF unit is the most common solution when the antenna and RF unit are not in the same place or one RF unit is designed to drive multiple antennas. Since RF signal is attenuated in the cable, the length of the cable, i.e. the distance between the remote antenna and the central unit, has a big impact on the radio performance. This should be taken into consideration in particular when FR2 band are used for vehicular communication. Instead of passive antenna, amplifier can be built into the antenna to compensate the cable loss. This is considered as part of option 1.<br>Benefits: Passive antenna has less demand on installation space and it is flexible to mount. The complexity of remote unit is the lowest among all options.<br>Cons: Radio performance is impacted by cable length. As the cable loss scales with the frequency this gets more critical the higher the carrier frequency, e.g. at FR2 band. Number of cables linearly increases with the number of MIMO ports at each panel. Implications of analogue beamforming in FR2 unclear. |
| Option 1: RF − PHY split (Analog interface) | Antennas and RF are in the DU and the other functionalities are in the CU. RF signals from different DUs can be combined at CU. The cable loss can be reduced when the RF signal is converted to intermediate frequency band. However, the cable length remains as a limitation in the system design. One more advantage of the frequency converter is in the multi-panel MIMO scenario. With the frequency converter, multiple streams from one MIMO panel can be frequency multiplexed and transferred in one cable.<br>Benefits: Less cable loss if intermediate frequency conversion is applied. Possible to multiplex the MIMO stream from the same panel.<br>Cons: Radio performance is impacted by cable length. |
| Option 2: RF + ADC/DAC − PHY split (Digital interface) | Antennas, RF and ADC/DAC are in the DU and the other functionalities are in the CU. Moving ADC/DAC to the remote unit enables the digital transmission between CU and DU. In the option, time-domain I/Q samples are transmitted via interface between CU and DU. Within the size of a vehicle the cable length and the distance between CU and DU is no more the bottleneck for the system design. Both copper and fiber solution can be used for the cabling. However, the capability of current copper cable might be critical for a multi-panel MIMO system. In addition, if FR2 is applied in the future and more than 100 MHz is available for V2X communication, fiber might be the only solution for this option.<br>Benefits: Not limited by cable length. Possible to multiplex the MIMO streams from the same panel. Joint processing for the signal from/to different DUs in physical layer operation can be supported efficiently, (e.g., joint MIMO equalization, LLR combining) Specifically, when channel decoding is performed in CU, combining gain is achieved. In addition, multiple DUs can be utilized to gain the selection diversity, or redundant/duplicated packet TX/RX<br>Cons: The throughput requirement between CU and DU increases linearly with the number of bands, bandwidth per band, and number of antennas at each DU. Eventually increased cost due to fiber solution. The cost of fiber solution increases with the throughput demand on CU/DU interface. Interface between CU and DU need to be standardized. (CPRI as reference) |

TABLE 6-continued

| | |
|---|---|
| Option 3: Intra-modem function split | Several sub-options with different split of protocol stack layers can be considered. In these sub-options of Option 3, multiple DUs can be utilized to gain the selection diversity, or to transmit/receive redundant/duplicated packets.<br>If the functions are split to the DUs, it is still possible to have a direct physical or logical link between the DUs which can enable the direct coordination between DUs. However, such link will bring additional overhead and complexity to the system. In the remaining part of report, we always refer to a split without direct connection between DUs if it is not specified in the text.<br>Note: To comply with the 3GPP communication standards, for some of the option 3 CU/DU functions splits coordination of different functions across DUs is required. |
| Option 4: Split into individual UEs | In this split option, application is in the CU only. NAS, RRC, PDCP, RLC, MAC, physical layer and RF are in the DU, thus the entire control and user plane are in the DU. In 3GPP topology, each DU is interpreted as an individual UE. Each UE may have different UE ID, and the vehicle with multiple DUs is regarded as a group of UEs, or multiple UEs. This could be an attribute which differentiates Option 4 from the other options (Option 1, 2 and 3).<br>No coordination is required between the DUs in the communication layer. However, coordination on the application layer is still possible, or in some cases is required.<br>Benefits: Each remote unit can be updated and replaced individually. It is possible to integrate with other active devices or sensors in the vehicle. It is possible to use a common interface/bus to communicate with the central application unit.<br>Cons: Cost of multiple UE. Each UE need individual space. Less efficient due to leak of coordination. DUs (UEs) might compete for radio resource and might even interfere with each other. |

Meanwhile, in the case of Option 3 of Table 5 and/or Table 6, various modified models may be considered depending on how functions/stacks in a modem are split between the CU and DUs.

Referring to FIG. 12, Option 3 may include modified models of Option 3-A, Option 3-B, Option 3-C, Option 3-D, Option 3-E, Option 3-F, and Option 3-G. Each of the modified models has the following characteristics and advantages/disadvantages.

1) Option 3A: Low PHY-High PHY Split

In Option 3A, a DU may include an RF and part of a physical layer function (=Low-PHY). A CU may include higher layers and the other part of the physical layer function (=High-PHY). Functional split into High-PHY and Low-PHY described above may be modified in several ways. For example, Low-PHY may include fast Fourier transmission (FFT)/inverse fast Fourier transform (IFFT), CP removal/addition, and/or MIMO (de)coding. High-PHY may include channel coding (or channel decoding).

Benefits: ① Throughput demand between the CU and the DU are much lower than in Option 2. ② Only a part of information related to a specific UE (vehicle) may be transmitted or exchanged between the CU and the DU through a specific PHY process (e.g., FFT/IFFT and/or CP removal/addition). ③ In this split (Low PHY-High PHY split), joint processing for signals from or to different DUs in physical layer operation may be efficiently supported.

Disadvantages: ① complexity of the RU or the DU may be increased. ② An interface between the CU and the DU needs to be defined or standardized, 2) Option 3B: PHY-MAC Split For option 3B, higher layer and MAC functions are performed in the CU. All of physical layer operation may be supported or performed in the DU. For example, HARQ operation of the same MAC PDU for multiple DUs may be supported in a centralized manner. In this case, a throughput demand may be further reduced as compared to Option 3A. Only MAC package and MAC layer signaling may be transmitted between the CU and the DU.

Benefits: Throughput between the CU and the DU is greatly lowered.

Disadvantages: Since there is no PHY layer coordination between a plurality of DUs, the efficiency of MIMO gain may be reduced.

3) Other Option 3X (Option 3-C, Option 3-D, Option 3-E, Option 3-F, and Option 3-G)

In the case of CU/DU split (or CU/DU functional split) in a higher layer, throughput demand between the DU and the CU may be further reduced. The efficiency of multi-antenna coordination and MIMO gain at the same timing may be decreased due to a tradeoff. Latency caused by transmission between the CU and the DU may cause performance degradation because scheduling, radio resource measurement (RRM), and HARQ/ARQ processes are affected by additional delay. However, such degradation may be insignificant in terms of the UE.

In the case of "Option 3A: Low PHY-High PHY split", various modified implementation models of Option 3A may be defined depending on up to which operation (or which specific operation) is defined as Low PHY among physical layer operations/procedures. In other words, various modified implementation models of Option 3A may be defined depending on up to which operation (or which specific operation) among the physical layer operations/procedures is implemented at the DU side or up to which operation (or which specific operation) among the physical layer operations/procedures is actually performed at the DU side.

Hereinafter, the modified implementation models of Option 3A series will be proposed, and information to be exchanged through an interface between the CU and the DU when a related model is implemented will be described in detail.

Proposal 1

In modified implementation of Option 3A series, an Rx operation may be implemented such that different channels/signals are individually decoded in each of the CU and DU.

① As an example, a synchronization signal and/or a PSFCH may be decoded in the DU, and a PSCCH/PSSCH may be decoded in the CU. In other words, physical layer operations/procedures may be split such that the synchronization signal and/or the PSFCH is decoded in the DU and the PSCCH/PSSCH is decoded in the CU. Alternatively, ② the synchronization signal, the PSFCH, and/or the PSCCH may be decoded in the DU, and the PSSCH may be decoded in the CU. In other words, the physical layer operations/procedures may be split such that the synchronization signal, the PSFCH, and/or the PSCC is decoded in the DU and the PSSCH is decoded in the CU. Alternatively, ③ the synchronization signal, the PSFCH, and/or the PSSCH may be implemented to be decoded in the DU and the PSCCH may be implemented to be decoded in the CU.

Here, decoding of the synchronization signal may be interpreted as synchronization sequence detection and/or PSBCH decoding. In the examples of ①/②/③ above, when decoding of the synchronization signal includes only "synchronization sequence detection", PSBCH decoding means that the PSBCH is decoded in the CU. In other words, in the example of '① ', if decoding of the synchronization signal means only synchronization sequence detection (or corresponds to synchronization sequence detection), the PSBCH/PSCCH/PSSCH may be implemented to be decoded in the CU.

Meanwhile, while the examples of ①/②/③ have described the case in which decoding of the PSFCH is performed in the DU, decoding of the PSFCH may be implemented to be performed in the CU rather than in the DU. Specifically, in the case in which decoding of the PSFCH is performed in the form of sequence detection, it may be reasonable to perform decoding of the PSFCH in the DU. In the case of decoding a PSFCH payload, it may be desirable that decoding of the PSFCH is implemented to be performed in the CU in consideration of computational complexity and functional configuration required for computation. In other words, in the examples of ①/②/③), decoding of the PSFCH performed in the DU may be an operation of detecting a sequence of the PSFCH, and in this case, a decoding operation for the PSFCH payload may be performed in the CU.

In the case of '① ', functions such as FFT, CP removal, RE-demapping, channel estimation (e.g., equalization), demodulation, and channel decoding may be performed in the CU during an Rx operation. This may have the advantage of lowering computational/implementation complexity required for the DU as compared with '① ' and/or '③'.

Specifically, in the case of a distributed antenna system, an implementation cost of the DU may increase as the function of the DU increases and/or the implementation/calculation complexity of the DU increases. In this case, since the total antenna system implementation cost increases in proportion to an increase in the number of DUs constituting the distributed antenna system, it may be undesirable to increase the implementation/computational complexity of the DU. In addition, since the above-mentioned Rx operations such as channel estimation (e.g., equalization), demodulation, and channel decoding may be performed "in the CU" based on signals/channels received from all/some DUs in the distributed antenna system, achievement of MIMO performance gain and combining gain may be advantageous.

In the case of '②', the UE may decode the PSCCH after establishing time synchronization and transfer information necessary for decoding the PSSCH, acquired by decoding the PSCCH, (e.g., PSSCH time/frequency resource information, a PSSCH DMRS pattern, the number of PSSCH DMRS ports, indexes of the ports, and/or information about a second SCI format) and/or an Rx signal to perform decoding of the PSSCH from the DU to the CU simultaneously (or sequentially) through a CU-DU interface. Alternatively, the information obtained by decoding the PSCCH in the DU (i.e., the information necessary for decoding the PSSCH) and the received PSSCH (or an in-phase and quadrature (IQ) signal based on the PSSCH) may be delivered to the CU through the CU-DU interface.

In this case, when only decoding of the PSCCH is performed in the DU and decoding of the PSSCH is performed in the CU, this has the advantage of lowering computational/implementation complexity and/or (required) decoding capability of the DU (compared to an implementation method of decoding both the PSCCH and the PSSCH in the DU or an implementation method of decoding the PSSCH in the DU and the PSCCH in the CU). In addition, similar to the case of '① ', decoding of the PSSCH may be performed in the CU based on signals/channels received from all/partial DUs in the distributed antenna system, which may be advantageous in obtaining MIMO performance gain and combining gain.

In the case of '③ ', an Rx signal (or the PSCCH and/or the PSSCH) may be transferred from the DU to the CU, and decoding of the PSCCH may be performed in the CU. Thereafter, the CU may transmit or transfer information necessary for decoding the PSSCH, acquired by decoding the PSCCH, (e.g., PSSCH time/frequency resource information, a PSSCH DMRS pattern, the number of PSSCH DMRS ports, indexes of the ports, and/or information about a second SCI format) to the DU through the CU-DU interface (or a first interface). In this case, the DU may perform decoding of the PSSCH based on the transferred control information (or the information necessary for decoding the PSSCH). In this case, compared to the implementation method of '② ', information exchange through the CU-DU interface may be further required one more time (first information exchange from the DU to the CU and second information exchange from the CU to the DU). Therefore, in order to satisfy a HARQ round trip time (RTT), processing within the CU and the DU needs to be implemented so as to be performed more quickly.

While Proposal 1 and the above-described embodiments have been described based on an Rx operation, Proposal 1 and the embodiments may be equally/similarly applied to functional split between the CU and the DU for a Tx operation. Meanwhile, CU/DU function split methods may be configured/implemented to be different from each other in the Tx operation and the Rx operation.

For example, the Tx operation may be implemented as "Option 2: RF+ADC/DAC−PHY split (digital interface)" described above, and the Rx operation may be implemented as "one of modifications of Option 3A". In the case of the Tx operation, since expected performance gain is very low even if more functions/operations are implemented at the DU side, it may be reasonable to reduce implementation complexity and implementation cost of the DU by minimizing implementation of a Tx-related operation in the DU.

However, since an interface payload required for the implementation model of Option 2 may be larger than that of the modification model of Option 3A series, when CU/DU functional split is implemented by Option 2 for the Tx operation (or Tx/Rx operation), CU-DU interface implementation with a larger capacity may be required as compared with other cases (when both the Tx and Rx operations are implemented by the modified model of Option 3A series or when the Tx operation is implemented by Option 3 series (e.g., 3B and 3C) other than Option 3A or by Option 4 series). However, since the three modified implementation models of Option 3A described above may be effective in improving Rx performance in the Rx operation, the distributed antenna implementation method may be reasonably achieved by implementing the Tx operation with Option 2 and the Rx operation with one of the modified models of Option 3A.

Proposal 2

In relation to Proposal 2, the following information may be transmitted from the CU to the DU or from the DU to the CU through the CU-DU interface (or first interface) according to the CU-DU functional distribution implementation method.

(1) First Functional Distribution

The first function distribution may be the case in which functions of synchronization, ADC, FFT, CP removal, and/or RE-demapping are performed in the DU, and functions of decoding the PSCCH and/or the PSSCH are performed in the CU.

Alternatively, decoding of the PSSCH or the PSCCH may be performed in the DU even in the first functional distribution case. In this case, the DU may obtain information necessary for decoding the PSSCH of the CU (hereinafter, first information) through decoding of the PSCCH and transfer the first information to the CU through the CU-DU interface. Here, the first information may include PSSCH time/frequency resource information, a PSSCH DMRS pattern, the number and/or indexes of PSSCH DMRS ports, and information about a second SCI format.

Alternatively (additionally/alternatively), the CU may transfer second information obtained by decoding the PSCCH in the CU to the DU through the CU-DU interface for the purpose of decoding the PSSCH in the DU. Here, the second information may include the PSSCH time/frequency resource information, the PSSCH DMRS pattern, the number and/or indexes of the PSSCH DMRS ports, and the information about the second SCI format, identical/similar to the first information. For example, the DU may determine an actually scheduled PSSCH frequency (and/or time) area based on the second information received from the CU and transfer only information mapped to the determined PSSCH frequency (and/or time) area (information required for actual PSSCH decoding of the CU) through the CU-DU interface to the CU.

In this case, the DU may perform operations or functions (synchronization, ADC, FFT, CP removal, and/or RE-demapping) before the CU decodes the PSCCH and/or the PSSCH and transfer output information (post-IFFT, IQ samples, and/or log likelihood ratio (LLR)) caused by the pre-decoding operations or functions to the CU through the CU-DU interface.

Alternatively (additionally/alternatively), a frequency domain IQ signal for an Rx signal may be transferred from the DU to the CU through the CU-DU interface. For example, the DU may obtain a frequency domain IQ signal for the PSSCH and/or the PSCCH and transfer the obtained frequency domain IQ signal to the CU through the CU-DU interface.

Alternatively (additionally/alternatively), timing information of the DU or CU-DU timing offset information may be transferred from the DU to the CU through the CU-DU interface.

(2) Second Functional Distribution

The second function distribution may be the case in which functions of synchronization, ADC, FFT, CP removal, decoding of the PSCCH, and/or RE-demapping are performed in the DU, and a function of decoding the PSSCH is performed in the CU.

In this case, the DU may transfer the first information obtained by decoding the PSCCH (information necessary for decoding the PSSCH in the CU) to the CU through the CU-DU interface. Here, the first information may include the PSSCH time/frequency resource information, the PSSCH DMRS pattern, the number and/or indexes of the PSSCH DMRS ports, and/or the information about the second SCI format.

Alternatively (additionally/alternatively), information about an Rx signal to perform decoding of the PSSCH may be transferred to the CU through the CU-DU interface. The information about the Rx signal may include IQ samples, post-IFFT, and LLR, obtained from the PSSCH and/or the PSCCH.

Alternatively (additionally/alternatively), the timing information of the DU or the CU-DU timing offset information may be transferred from the DU to the CU through the CU-DU interface.

(3) Third Functional Distribution

The third function distribution may be the case in which functions of synchronization, ADC, FFT, CP removal, RE-demapping, and/or decoding of the PSSCH are performed in the DU, and a function of decoding the PSCCH is performed in the CU.

In this case, signal information for the PSCCH/PSSCH through which decoding/processing is to be performed in the CU (e.g., IQ samples, post-IFFT, and/or LLR) among Rx signals of the DU may be transferred to the CU from the DU through the CU-DU interface.

Alternatively (additionally/alternatively), the second information obtained by decoding the PSCCH in the CU (information necessary for decoding the PSSCH in the DU) may be transferred to the DU from the CU through the CU-DU interface. Here, the second information may include the PSSCH time/frequency resource information, the PSSCH DMRS pattern, the number and/or indexes of the PSSCH DMRS ports, and/or the information about the second SCI format.

Alternatively (additionally/alternatively), the timing information of the DU or the CU-DU timing offset information may be transferred from the DU to the CU through the CU-DU interface.

Meanwhile, in the case of vehicular distributed antennas, the distributed antennas may be used to improve positioning accuracy of an in-vehicle UE. In this case, the following information may be transmitted/exchanged between the CU and the DU within a single UE through the CU-DU interface. The following information may be included in an information field of a packet transmitted through the CU-DU interface.

1) A relative position of each DU based on a reference point in the vehicle (e.g., coordinates and/or distance/direction), 2) an indicator indicating whether the DU operates normally, and/or 3) the timing information of the DU (or the CU-DU timing offset information) Separately from a reference signal for positioning (PRS), the above information may be aperiodically transmitted once (or multiple times) (or exchanged aperiodically between the CU and the DU through the CU-DU interface), when the power of the in-vehicle UE is turned on or before transmission/reception of the PRS is started. Alternatively, the information may be transmitted through the CU-DU interface together with or separately from the PRS at a longer transmission interval than a PRS transmission interval.

In addition, in the above-described (all possible) modified models of Option 3A series, "information as to whether PSFCH transmission is required (whether HARQ feedback is performed)" may be transmitted through the CU-DU interface. For example, when decoding of control information (e.g., first SCI and/or second SCI) is performed in the DU, the DU may determine whether PSFCH transmission is required through an indicator indicating whether HARQ feedback is performed and transfer or transmit the indicator or the information as to whether the PSFCH is transmitted through the CU-DU interface to the CU (in which a MAC layer is implemented).

Proposal 3

A UE having distributed antennas (or a UE to which latency or a time error/offset is capable of being added due to the CU-DU interface in the distributed antennas) may configure and/or select a time gap or a gap between a PSSCH reception timing and a PSFCH transmission (HARQ feedback) timing as follows. In other words, the UE may configure or determine a time gap related to HARQ feedback (PSFCH) transmission for the PSSCH in consideration of the latency or time error due to the CU-DU interface.

The UE may report characteristics/capabilities thereof indicating that the UE has the distributed antennas (or indicating that the latency or the time error/offset is capable of being added to the UE due to the CU-DU interface in the distributed antennas) to a BS. In this case, the UE may operate to expect that the PSFCH will be transmitted even if the latency, the time offset, and/or the time error occurs due to the CU-DU interface of the UE. In this case, the BS may configure and/or schedule a specific resource pool for transmitting and/or receiving signals for UEs having the same/similar characteristics/capacities based on the reported characteristics/capacities of the UE. In addition, a time gap for PSSCH-HARQ feedback in the specific resource pool may be configured based on a UE having ① the largest latency and/or time offset (time error) value in the resource pool, the farthest distance between the CU and the DU, and/or the largest latency and/or time offset (time error) value in the CU-DU interface/protocol or may be configured as ② the largest value among configurable time gaps for PSSCH-HARQ feedback.

Alternatively (additionally/alternatively), two (or more) time gaps for PSSCH-HARQ feedback may be configured in a single resource pool. In this case, the UE having the distributed antennas (or UE to which the latency or time error offset is capable of being added due to the CU-DU interface in the distributed antennas) may select a specific time gap capable of securing a transmittable timing of the PSFCH or select and/or configure the largest time gap, in consideration of latency and/or a time error/offset (hereinafter, time error) due to an interface between the CU-DU thereof.

Alternatively, one or more time gaps (or PSSCH-to-PSFCH time gaps) may be configured in the resource pool, and the UE may select a time gap which is greater than or equal to a requirement thereof from among the one or more time gaps. Alternatively, a time gap (or a PSSCH-to-PSFCH time gap) may be configured in each of a plurality of resource pools, and the UE may select a resource pool in which a time gap greater than or equal to the requirement thereof is configured from among the plurality of resource pools.

Alternatively, the UE may report capability thereof to the BS and expect or determine that the time gap (or PSSCH-to-PSFCH time gap) of the received or configured resource pool will be greater than or equal to the capability (or requirement) thereof.

Alternatively, the above-described capability or capability information of the UE may be transferred or transmitted through preconfigured signaling (e.g., PC5 RRC signaling) by the UE to a peer UE with which the UE performs communication (PC5). Here, when the above-described method is applied (or when a corresponding rule is applied), the UE receiving the capability information may derive a value of a (minimum) time gap (or PSSCH-to-PSFCH time gap) during which the UE should attempt to receive the PSFCH (related to the PSSCH transmitted by the UE) based on the capability information.

For example, the UE may inform the BS (and/or a peer UE performing communication (PC5) with the UE) of maximum supportable transmission rate information (MAX_DACA) through the CU-DU interface by predefined signaling (e.g., a PUCCH/PUSCH and/or PC5 RRC signaling). Here, when the corresponding rule is applied (or when the maximum transmission rate information is transmitted), the BS (or peer UE) that has received the maximum transmission rate information (MAX_DACA) may perform scheduling (and/or configure transmission parameters (e.g., the number of RBs, the number of layers, a modulation order, and/or a transport block size (TBS)) for the UE so that a maximum transmittable data amount (per unit time (e.g., one second)) does not exceed the value of MAX_DACA.

Meanwhile, the UE may report/transmit parameter values needed to derive the maximum transmission rate information (MAX_DACA), instead of reporting/transmitting the maximum transmission rate information (MAX_DACA), to the BS (and/or the peer UE communicating with the UE (PC5)). For example, when the maximum transmission rate information (MAX_DACA) is calculated by Equation 1 below, the UE may report/transmit $N_{subcarrier}$, Δf, Bitwidth, and/or $N_{antennaports}$ to the BS and/or the peer UE.

$$\text{MAX\_DACA}=N_{subcarrier}*\Delta f*\text{Bitwidth}*N_{antennaports} \quad \text{[Equation 1]}$$

Here, $N_{antennaports}$ is the total number of subcarriers (including inactive subcarriers) in a system, Δf is a subcarrier spacing, Bitwidth is the bit width of an IQ symbol, and $N_{antennaports}$ is the number of antenna ports of the DU.

Meanwhile, the aforementioned "PSCCH (or PSSCH)" may be extended to and interpreted as "PDCCH (or PDSCH)".

Examples of the above-described proposed methods may also be included as one of implementation methods of the present disclosure and, therefore, it is obvious that the examples are regarded as the proposed methods.

Meanwhile, the contents of the present disclosure are not limited to direct communication between UEs and may be used on UL or DL. In this case, a BS or a relay node may use the proposed methods. A rule may be defined such that the BS informs a UE of information as to whether to apply the proposed methods (or information about rules of the proposed methods) through a predefined signal (e.g., a physical layer signal or a higher layer signal). Further, various embodiments of the present disclosure may be combined with each other.

Figure 13:
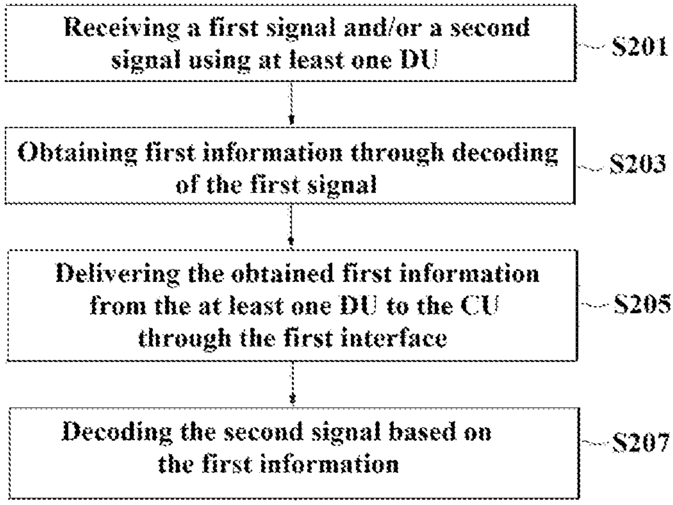
FIG. 13 is a diagram for explaining a method in which a UE receives signals using a CU and a DU.

FIG. 13 is a diagram for explaining a method in which a UE receives signals using a CU and a DU.

Referring to FIG. 13, the UE may receive a first signal and/or a second signal, using at least one DU (S201). Here, the first signal and the second signal may be simultaneously received or sequentially received at a time interval in the at least one DU. Alternatively, the first signal may correspond to a PSCCH, and the second signal may be a PSSCH based on the PSCCH. In this case, the UE may receive the PSCCH, which is the first signal, using the at least one DU and receive the PSSCH, which is the second signal, based on the PSCCH.

Next, the UE may decode the first signal using the at least one DU (or in the at least one DU) and obtain first information, which is decoding information for the first signal (S203). The UE may deliver the obtained first information from the at least one DU to a CU through a first interface (or a CU-DU interface) (S205). In other words, the first information may be delivered from the at least one DU to the CU through the first interface.

Alternatively, when the first signal is the PSCCH and the second signal is the PSSCH, the first information may include resource information for the PSSCH needed to decode the second signal, and a DMRS pattern for the PSSCH, the number of PSSCH DMRS ports, indexes of the PSSCH DMRS ports, and information about a second SCI format. That is, the first interface may be an interface through which digital information between the DU and the CU, rather than an analog signal between an existing DU and the CU, is transferred.

Alternatively, timing information for the at least one DU may be delivered from the at least one DU to the CU through the first interface. The timing information may include timing information in the DU (e.g., a synchronization time based on a synchronization signal and an Rx timing of an Rx signal) and/or timing offset information between the DU and the CU.

Alternatively, the at least one DU may deliver the first information, which is the decoding information for the first signal, to the CU through the first interface and deliver the second signal received (simultaneously or sequentially) in correspondence to the first signal to the CU as an analog signal through an analog interface.

Alternatively, the at least one DU may deliver the first information, which is the decoding information for the first signal, to the CU through the first interface and deliver an output value or output information according to a pre-decoding operation or function for the second signal received in correspondence to the first signal to the CU through the first interface. The pre-decoding operation or function may be an operation of performing at least one of synchronization, ADC, FFT, CP removal, or RE-demapping upon an Rx signal (e.g., an analog signal). In addition, the output value or output information according to the pre-decoding operation may include information about IQ samples, a post-IFFT output value, and LLR, for the first signal and/or the second signal. In other words, at least one of the first information for the first signal, the information about the IQ samples for the second signal, or the timing information for the at least one DU in relation to the second signal may be delivered from the at least one DU to the CU through the first interface. Meanwhile, the post-IFFT may be an operation or function related to DFT.

Alternatively, the at least one DU may transfer the output values or output information according to the pre-decoding operation for the first signal and the second signal (output information according to synchronization, ADC, FFT, CP removal, and RE-demapping) to the CU through the first interface, and the CU may perform decoding upon the first signal and the second signal based on the output information for the first signal and the output information for the second signal.

Next, the UE may decode the second signal based on the first information delivered through the first interface using the CU (S207). Here, the second signal may be delivered to the CU through the first interface as an analog signal received from the at least one DU or may be delivered to the CU through the first interface as the output information (e.g., IQ samples) according to the pre-decoding operation in the at least one DU.

In other words, the CU may receive the analog signal for the second signal from the at least one DU through the analog interface or receive the output information (IQ samples, post-IFFT output value, and LLR) from the at least one DU through the first interface. In the former case, the CU may perform the pre-decoding operation and the decoding operation upon the second signal based on the first information, and in the latter case, the CU may decode the output information (upon which the pre-decoding operation has been performed) related to the second signal based on the first information.

Next, the UE may transmit HARQ feedback or a feedback signal to a peer UE or the BS based on reception of the second signal. As described above, the HARQ feedback or the feedback signal may be transmitted based on the specific time gap or time gap (hereinafter, time gap) related to HARQ feedback. Alternatively, as described above, when a HARQ procedure related to the second signal is requested or indicated, the UE may transmit the HARQ feedback or the feedback signal to the peer UE or the BS based on reception of the second signal.

Specifically, the UE may transmit the feedback signal related to the second signal after the time gap based on an Rx time of the second signal. The time gap may be configured or determined in consideration of time latency or a time error (which may occur between the DU and the CU due to the first interface) due to transmission of the first information or the output information according to the pre-decoding operation through the first interface.

Alternatively, the time gap may be configured correspondingly for each resource pool as described above. In this case, the UE may report occurrence/non-occurrence of the time latency or time error related to the first interface and/or capability information including information about the time latency or time error to the BS. The BS may allocate or configure a resource pool having a time gap capable of accommodating the time latency or time error to or for the UE.

Alternatively, a plurality of time gaps may be configured for one resource pool. For the UE, a plurality of resource pools may be configured and one time gap may be configured for each resource pool. When a plurality of time gaps is configured for the resource pool, the UE may select one of the plurality of time gaps based on the time latency or time error. Alternatively, when a plurality of resource pools is configured for the UE, the UE may preconfigure a resource pool in which a time gap capable of accommodating the time latency or time error is configured among the plurality of resource pools.

Alternatively, the UE may transmit information about the configured time gap to the peer UE that has transmitted the first signal and the second signal. This serves to previously inform the peer UE of the transmission delay of the feedback signal due to the time error or time latency caused by the first interface.

Alternatively, the UE may previously transmit information about a maximum supportable transmission rate for the first interface required by the peer UE. For example, the peer UE may derive or determine the time gap or perform scheduling for the second signal, based on information about the maximum supportable transmission rate for the first interface.

Figure 14:
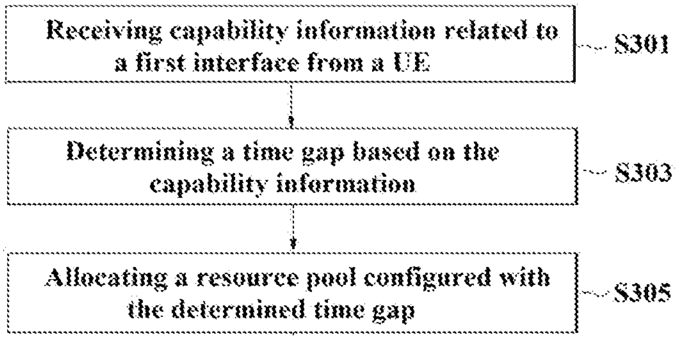
FIG. 14 is a diagram for explaining a method in which a BS allocates a resource pool to a UE.

FIG. 14 is a diagram for explaining a method in which a BS allocates a resource pool to a UE.

Referring to FIG. 14, the BS may receive capability information from the UE (S301). The capability information may include information about time latency and/or a time error related to a first interface included in the UE.

Here, the first interface may be a digital interface through which digital information (e.g., first information) is transmitted between at least one DU and a CU included in the UE as described above. Specifically, decoding information of some of signals received by the DU may be delivered through the first interface or output information according to a pre-decoding operation some of the signals received by the DU may be transmitted through the first interface. In this case, an additional time latency or time error may occur in performing decoding upon Rx signals due to exchange of the digital information caused by the first interface. The time latency and/or time error related to the first interface described above may include the additional time latency and time error described above.

Next, the BS may configure or determine a time gap related to a HARQ feedback procedure for the signals received from the UE based on the time error related to the first interface included in the capability information (S303). For example, the BS may configure the time gap of a size capable of accommodating the time latency and/or the time error by additionally considering information about the time latency and/or the time error related to the first interface. Here, the time gap may be configured in relation to a resource pool to be allocated to the UE. That is, when allocating the resource pool to the UE, the BS may configure a time gap corresponding to the resource pool.

Next, the BS may transmit a signal for allocating the resource pool in which the time gap is configured to the UE (S305).

Alternatively, the BS may allocate a plurality of resource pools including at least one resource pool in which the time gap capable of accommodating the time error related to the first interface is configured to the UE based on the capability information. In this case, the time gap may be determined through selection of a resource pool by the UE.

Alternatively, the BS may configure a plurality of time gaps in the one resource pool. The plurality of time gaps may include at least one time gap capable of accommodating the time error related to the first interface based on the capability information. In this case, the UE may select a corresponding time gap according to the above-described options for distributing a modem function between the at least one DU and the CU.

Communication System Example to which the Present Disclosure is Applied

Although not limited thereto, various descriptions, functions, procedures, proposals, methods, and/or operational flow charts of the present disclosure disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 15:
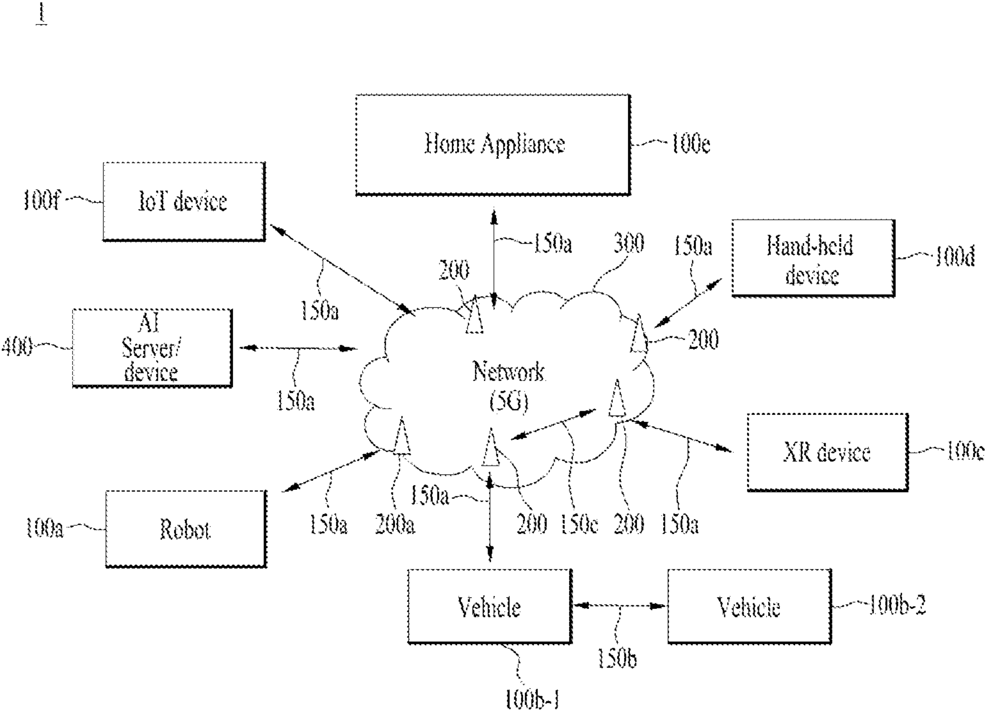
FIG. 15 illustrates a communication system applied to the present disclosure.

FIG. 15 illustrates a communication system applied to the present disclosure.

Referring to FIG. 15, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of Wireless Devices to which the Present Disclosure is Applied

Figure 16:
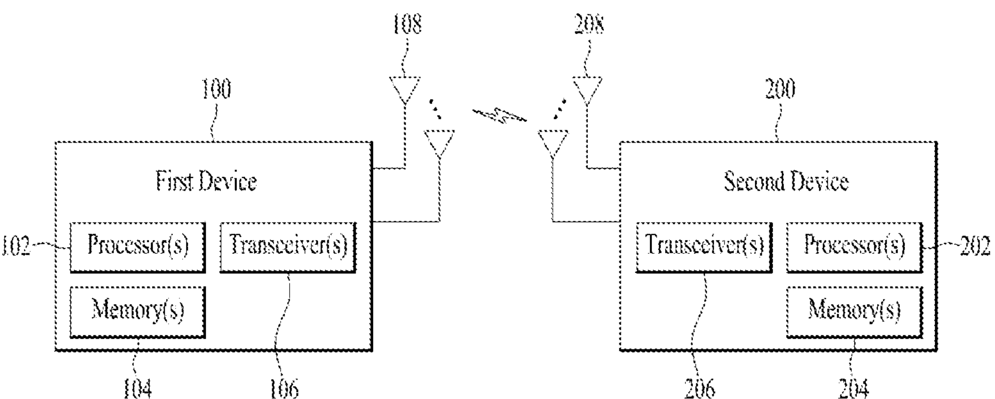
FIG. 16 illustrates wireless devices applicable to the present disclosure.

FIG. 16 illustrates a wireless device applicable to the present disclosure.

Referring to FIG. 16, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 15.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information acquired by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

Specifically, the first wireless device 100 or a UE may include the processor(s) 102 and the memory(s) 104, connected to the RF transceiver(s). The memory(s) 104 may include at least one program capable of performing operations related to the embodiments described with reference to FIGS. 10 to 14.

The processor(s) 102 may receive a first signal and a second signal by controlling at least one DU including the RF transceiver(s), deliver first information, which is decoding information for the first signal, from the at least one DU to a CU through a first interface, and decode the second signal based on the first information by controlling the CU. Here, a feedback signal related to the second signal may be transmitted based on a time gap configured for the second signal, and the time gap may be configured in consideration of time latency or a time error related to the first interface. The processor(s) 102 may perform the operations described with reference to FIGS. 10 to 14 based on the program included in the memory(s) 104.

Alternatively, a chipset including the processor(s) 102 and the memory(s) 104 may be configured. In this case, the chipset may include at least one processor, and at least one memory operably connected to the at least one processor and causing, when executed, the at least one processor to perform operations. The operations may include receiving a first signal and a second signal, using at least one DU, delivering first information, which is decoding information for the first signal, from the at least one DU to a CU through a first interface, and decoding the second signal based on the first information using the CU. Here, a feedback signal related to the second signal may be transmitted based on a time gap configured for the second signal, and the time gap may be configured in consideration of time latency or a time error related to the first interface. The above operations may include the operations described with reference to FIGS. 10 to 14 based on the program included in the memory(s) 104.

Alternatively, a computer-readable storage medium including at least one computer program that causes the at least one processor to perform operations is provided. The operations may include receiving a first signal and a second signal, using at least one DU, delivering first information, which is decoding information for the first signal, from the at least one DU to a CU through a first interface, and decoding the second signal based on the first information using the CU. Here, a feedback signal related to the second signal may be transmitted based on a time gap configured for the second signal, and the time gap may be configured in consideration of time latency or a time error related to the first interface. The above operations may include the operations described with reference to FIGS. 10 to 14.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Specifically, the second wireless device 200 or a BS may include the processor(s) 202 and the memory(s) 204, connected to the RF transceiver(s). The memory(s) 104 may include at least one program capable of performing operations related to the embodiments described with reference to FIGS. 10 to 14.

The processor(s) 202 may receive a report on capability information including information about time latency or a time error related to a first interface from the UE by controlling the RF transceiver(s), configures a time gap for a resource pool based on the capability information; and transmit a signal for allocating the resource pool in which the time gap is configured to the UE. The first interface may be an interface through digital information is transferred between at least one distributed antenna unit and a central antenna unit, disposed in the UE, and the time gap may be related to a transmission timing of a feedback signal based on reception of a PSSCH.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to which the Present Disclosure is Applied

Figure 17:
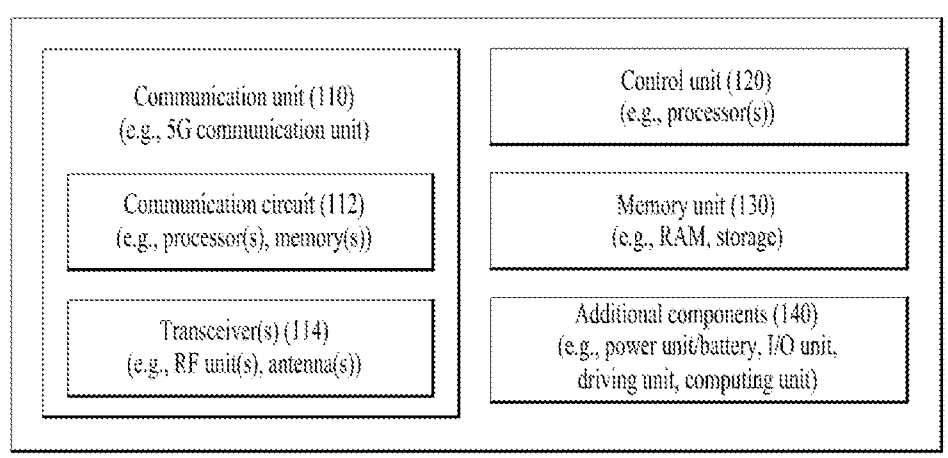
FIG. 17 illustrates another example of a wireless device to which the present disclosure is applied.

FIG. 17 illustrates another example of a wireless device applied to the present disclosure. The wireless device may be implemented in various forms according to a use-case/service (refer to FIG. 15).

Referring to FIG. 17, wireless devices 100 and 200 may correspond to the wireless devices 100 and 200 of FIG. 16 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 16. For example, the transceiver(s) 114 may include the one or more transceivers 106 and 206 and/or the one or more antennas 108 and 208 of FIG. 16. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 15), the vehicles (100*b*-1 and 100*b*-2 of FIG. 15), the XR device (100*c* of FIG. 15), the hand-held device (100*d* of FIG. 15), the home appliance (100*e* of FIG. 15), the IoT device (100*f* of FIG. 15), a digital broadcast terminal, a hologram device, a public safety device, an MTC device, a medicine device, a fintech device (or a finance device), a security device, a climate/environment device, the AI server/device (400 of FIG. 15), the BSs (200 of FIG. 15), a network node, etc. The wireless device may be used in a mobile or fixed place according to a use-example/service.

In FIG. 17, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 18:
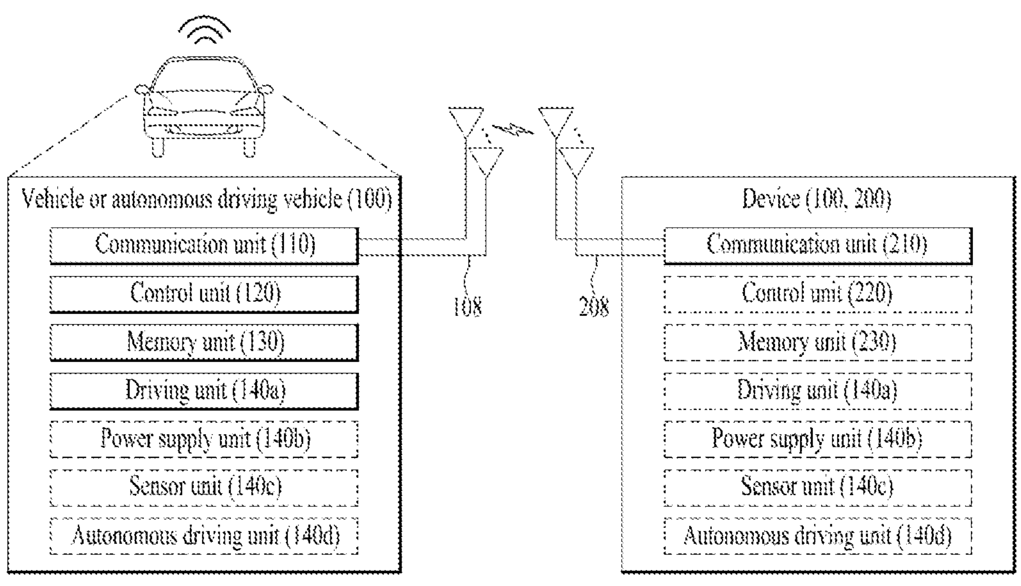
FIG. 18 illustrates a vehicle or an autonomous driving vehicle applied to the present disclosure.

Examples of Vehicles or Autonomous Vehicles to which the Present Disclosure is Applied FIG. 18 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 18, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 17, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). Also, the driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the acquired data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly acquired data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Here, wireless communication technologies implemented in the wireless devices (XXX, YYY) of the present specification may include LTE, NR, and 6G, as well as Narrowband Internet of Things for low power communication. At this time, for example, the NB-IoT technology may be an example of a Low Power Wide Area Network (LPWAN)

technology, and may be implemented in standards such as LTE Cat NB1 and/or LTE Cat NB2, and is not limited to the above-described names. Additionally or alternatively, the wireless communication technology implemented in the wireless devices (XXX, YYY) of the present specification may perform communication based on LTE-M technology. In this case, as an example, the LTE-M technology may be an example of LPWAN technology, and may be referred to by various names such as eMTC (enhanced machine type communication). For example, LTE-M technology may be implemented in at least one of a variety of standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described names. Additionally or alternatively, the wireless communication technology implemented in the wireless devices (XXX, YYY) of the present specification is at least one of ZigBee, Bluetooth, and Low Power Wide Area Network (LPWAN) considering low power communication, and is not limited to the above-described names. As an example, ZigBee technology can generate personal area networks (PANs) related to small/low-power digital communication based on various standards such as IEEE 802.15.4, and may be called various names.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure.

The above-described embodiments of the present disclosure are applicable to various mobile communication systems.

What is claimed is:

1. A method of receiving signals using at least one distributed antenna unit (DU) and a center antenna unit (CU) by a user equipment (UE) in a wireless communication system supporting sidelink, the method comprising:

receiving a first signal using the at least one DU;

receiving a second signal using the at least one DU;

delivering first information, which is decoding information for the first signal, from the at least one DU to the CU through a first interface; and decoding the second signal based on the first information using the CU, wherein a feedback signal related to the second signal is transmitted based on a time gap configured for the second signal, and wherein the time gap is configured based on a time latency or a time error related to the first interface.

2. The method of claim 1, wherein the first information includes at least one of resource information for a physical sidelink shared channel (PSSCH), a demodulation reference signal (DMRS) pattern for the PSSCH, the number of PSSCH DMRS ports, indexes of the PSSCH DMRS ports, or information about a second sidelink control information (SCI) format, based on the first signal being a physical sidelink control channel (PSCCH) and the second signal being the PSSCH.

3. The method of claim 1, wherein the time gap is selected as one of a plurality of time gaps configured with respect to a resource pool configured for the UE, based on the time latency or the time error related to the first interface.

4. The method of claim 1, further comprising reporting capability information including information about the time latency or the time error to a base station.

5. The method of claim 1, wherein the UE transmits information about the configured time gap to a peer UE that has transmitted the first signal and the second signal.

6. The method of claim 1, wherein the UE transmits information about a maximum transmission rate supportable by the first interface.

7. The method of claim 1, the first interface delivers timing information about the at least one DU to the CU from the at least one DU.

8. The method of claim 1, wherein the at least one DU performs at least one of cyclic prefix (CP) removal, fast Fourier transform (FFT), or resource demapping, with respect to the second signal.

9. The method of claim 1, wherein the first interface delivers at least one of in-phase and quadrature (IQ) samples obtained from the second signal or timing information about the at least one DU in relation to the second signal to the CU from the at least one DU.

10. A method of allocating a resource pool to a user equipment (UE) by a base station in a wireless communication system supporting sidelink, the method comprising:

receiving a report on capability information including information about time latency or a time error related to a first interface from the UE;

configuring a time gap for a resource pool based on the capability information; and transmitting a signal for allocating the resource pool in which the time gap is configured to the UE, wherein the first interface is an interface through which digital information is transferred between at least one distributed antenna unit and a central antenna unit, disposed in the UE, and wherein the time gap is related to a transmission timing of a feedback signal based on reception of a physical sidelink shared channel (PSSCH).

11. A user equipment (UE) for receiving signals in a wireless communication system supporting sidelink, the UE comprising:

a radio frequency (RF) transceiver; and a processor connected to the RF transceiver, wherein the processor is configured to receive a first signal and a second signal by controlling at least one distributed antenna unit (DU) including the RF transceiver, deliver first information, which is decoding information for the first signal, from the at least one DU to a central antenna unit (CU) through a first interface, and decode the second signal based on the first information by controlling the CU, and wherein a feedback signal related to the second signal is transmitted based on a time gap configured for the second signal, and wherein the time gap is configured based on a time latency or a time error related to the first interface.

12. The UE of claim 11, wherein the first information includes at least one of resource information for a physical sidelink shared channel (PSSCH), a demodulation reference signal (DMRS) pattern for the PSSCH, the number of PSSCH DMRS ports, indexes of the PSSCH DMRS ports, or information about a second sidelink control information (SCI) format, based on the first signal being a physical sidelink control channel (PSCCH) and the second signal being the PSSCH.

* * * * *